(12) United States Patent
Mansour et al.

(10) Patent No.: US 12,438,577 B2
(45) Date of Patent: Oct. 7, 2025

(54) WIRELESS LAN UPLINK MULTI-USER MIMO TRANSMISSION

(71) Applicant: MaxLinear, Inc., Carlsbad, CA (US)

(72) Inventors: Avi Avraham Mansour, Givat-Shmuel (IL); Sigurd Schelstraete, Menlo Park, CA (US); Ziv Avital, Kadima (IL); Rainer Strobel, Munich (DE)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 18/506,966

(22) Filed: Nov. 10, 2023

(65) Prior Publication Data

US 2024/0171231 A1 May 23, 2024

Related U.S. Application Data

(60) Provisional application No. 63/383,255, filed on Nov. 10, 2022.

(51) Int. Cl.
| | | |
|---|---|---|
| *H04L 1/02* | (2006.01) | |
| *H04B 7/0452* | (2017.01) | |
| *H04B 7/0456* | (2017.01) | |
| *H04L 25/02* | (2006.01) | |

(52) U.S. Cl.
CPC ......... *H04B 7/0452* (2013.01); *H04B 7/0456* (2013.01); *H04L 25/0204* (2013.01)

(58) Field of Classification Search
CPC ...... H04B 7/02; H04B 7/0452; H04B 7/0697; H04L 5/0007; H04W 88/08; H04W 72/563; H04W 72/121; H04W 72/04; H04W 74/002

USPC .......................................... 375/267, 260, 262
See application file for complete search history.

(56) References Cited

U.S. PATENT DOCUMENTS

| | | | |
|---|---|---|---|
| 2012/0275376 A1 | 11/2012 | Sampath et al. | |
| 2015/0092824 A1 | 4/2015 | Wicker et al. | |
| 2017/0202026 A1* | 7/2017 | Ahn | .................. H04W 74/0833 |
| 2017/0257153 A1 | 9/2017 | Xia et al. | |
| 2018/0070330 A1* | 3/2018 | Chu | ..................... H04W 72/04 |
| 2018/0138959 A1 | 5/2018 | Chun et al. | |
| 2019/0090200 A1 | 3/2019 | Alpert et al. | |

(Continued)

OTHER PUBLICATIONS

International Search Report and Written Opinion for PCT/US2023/079442 mailed Mar. 4, 2024.

*Primary Examiner* — Khai Tran
(74) *Attorney, Agent, or Firm* — Buchalter; Jason W. Croft

(57) ABSTRACT

An access point (AP) for wireless communication may include data processing hardware; and memory hardware in communication with the data processing hardware, the memory hardware storing instructions that when executed on the data processing hardware cause the data processing hardware to perform operations including: identifying, at the AP, one or more transmitting stations having one or more spatial streams; sending, from the AP to the one or more transmitting stations, a sounding request; performing, at the AP, multiple user multiple input multiple output (MU-MIMO) channel estimation based on the sounding request response; computing, at the AP, one or more precoder coefficients for the one or more transmitting stations based on the MU-MIMO channel estimation; and sending, from the AP to the one or more transmitting stations, the one or more precoder coefficients and a transmission trigger.

20 Claims, 14 Drawing Sheets

(56) References Cited

U.S. PATENT DOCUMENTS

2019/0334589 A1    10/2019  Strong
2021/0119679 A1     4/2021  Ksairi et al.
2023/0354377 A1*   11/2023  Yang ................. H04W 28/0278

* cited by examiner

WIRELESS LAN UPLINK MULTI-USER MIMO TRANSMISSION

RELATED APPLICATION

This application claims the benefit of U.S. Provisional Application No. 63/383,255, filed Nov. 10, 2022, the disclosure of which is incorporated herein by reference in its entirety.

This disclosure relates to aspects of wireless communications, and more specifically, to wireless local area networks (WLAN) uplink multi-user (MU) multiple-input and multiple-output (MIMO) transmission (MU-MIMO).

BACKGROUND

Unless otherwise indicated herein, the materials described herein are not prior art to the claims in the present application and are not admitted to be prior art by inclusion in this section.

Wi-Fi® communications may be configured to occur in multiple frequency bands, including the 2.4 gigahertz (GHz), 5 GHz, and 6 GHz frequency bands. Some Wi-Fi® communications may be configured to communicate using the same or similar frequencies as other Wi-Fi® communications. In some circumstances, interference between different Wi-Fi® communications may occur.

The subject matter claimed in the present disclosure is not limited to examples that solve any disadvantages or that operate only in environments such as those described above. Rather, this background is only provided to illustrate one example technology area where some examples described in the present disclosure may be practiced.

SUMMARY

An access point (AP) for wireless communication may include data processing hardware; and memory hardware in communication with the data processing hardware. The memory hardware may store instructions that when executed on the data processing hardware may cause the data processing hardware to perform operation. The operations may include identifying, at the AP, a plurality of transmitting stations having a plurality of spatial streams. The operations may include sending, from the AP to the plurality of transmitting stations, a sounding request. The operations may include performing, at the AP, multiple user multiple input multiple output (MU-MIMO) channel estimation based on a sounding request response. The operations may include computing, at the AP, one or more precoder coefficients for the plurality of transmitting stations based on the MU-MIMO channel estimation. The operations may include sending, from the AP to the plurality of transmitting stations, the one or more precoder coefficients and a transmission trigger.

A transmitting station (STA) for wireless communication may include data processing hardware; and memory hardware in communication with the data processing hardware. The memory hardware may store instructions that when executed on the data processing hardware may cause the data processing hardware to perform operations. The operations may include receiving, at the STA from an access point (AP), a sounding request. The operations may include sending, from the STA to the AP, a sounding packet in response to the sounding request. The operations may include receiving, at the STA from the AP, one or more precoder coefficients. The operations may include receiving, at the STA from the AP, a transmission trigger. The operations may include performing, at the STA, multiple input multiple output (MIMO) precoding using the one or more precoder coefficients.

A method for uplink multiple user multiple input multiple output (UL MU-MIMO) may include performing, at an access point (AP), multiple input multiple output (MIMO) channel estimation in an uplink (UL) direction for a plurality of transmitting stations (STAs). The method may include computing, at the AP, one or more precoder coefficients based on the MIMO channel estimation. The method may include sending, from the AP to the plurality of STAs, the one or more precoder coefficients.

The objects and advantages of the embodiments will be realized and achieved at least by the elements, features, and combinations particularly pointed out in the claims.

Both the foregoing general description and the following detailed description are given as examples, are explanatory, and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Figure 1:
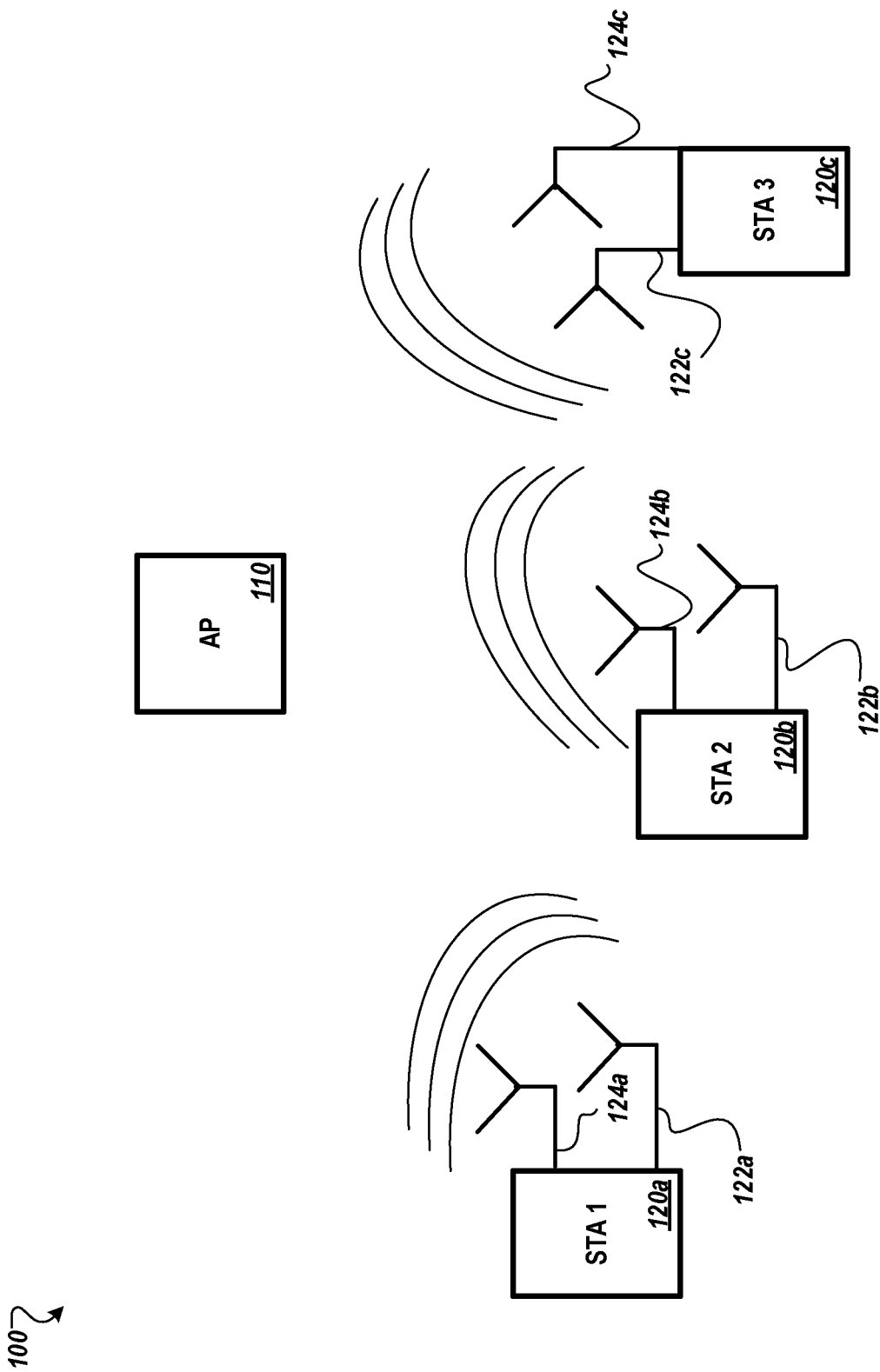
FIG. 1 illustrates an example wireless local area network (WLAN) system with one access point (AP) and multiple stations (STA) equipped with multiple antennas.

Multiple user multiple input multiple output (MU-MIMO) transmission may increase spectral efficiency in wireless local area networks (WLAN) because multiple stations at the same time and frequency may be served, and may be separated in the spatial domain. When the transmitter is equipped with multiple antennas, the spatial separation may achieved by precoding at the transmitter side, which may be more efficient than receiver side multiple input multiple output (MIMO) equalization at the receiver.

While MU MIMO precoding may be used for downlink transmission from the AP to the stations, MIMO precoding has not been used for uplink transmission from the stations to the AP. Stations may be equipped with more than one antenna, which may allow for MU MIMO precoding in uplink transmission.

For uplink MU MIMO transmission, in comparison to downlink MU MIMO, the precoder matrix calculation may be performed jointly for stations with knowledge of the channels between transmit antennas of stations and receive antennas of the AP. Therefore, the precoder calculation may be performed centrally at the AP, and the precoders may be applied at the stations. A protocol for communication of the precoder matrices from the AP to the stations may be used.

Further, channel estimation of the upstream channel may be performed in addition to the downstream channel estimation, which may use sounding packets transmitted in the upstream synchronously by the stations. In comparison to downstream MU MIMO, upstream MU MIMO sounding may handle clock and phase drifts between the different transmitting stations.

In WLAN systems, MU MIMO transmission may be applied in downlink transmission. In uplink transmission, multiple antennas may be used to transmit phase shifted copies of a tx signal over the antennas, e.g., to transmit with higher power or higher linearity than over a single antenna. There has been no centrally coordinated MIMO precoding applied in uplink transmission in comparison to downlink transmission.

In some examples, the station's multiple antennas may be used to perform MIMO precoding for uplink transmission. To enable uplink multi-user MIMO transmission, some techniques may include one or more of: (i) MIMO channel estimation in the uplink direction from the stations to the AP (which may be implicit, using an uplink data transmission, or explicit, using a dedicated uplink sounding packet), (ii) calculation of MU MIMO uplink precoder coefficients for the transmitting stations (which may be performed centrally at the AP), (iii) communication of the precoders from the AP to the transmitting stations (e.g., using a protocol to exchange the precoder coefficients), or (iv) precoding at the station for uplink MU MIMO transmission.

The disclosed systems and methods may increase the capacity uplink transmission without added cost and/or complexity when using the proposed transmission scheme is low. Moreover, higher uplink rates may lower power consumption and reduce latency when the packets use reduced transmission time.

As illustrated in FIG. 1, a wireless local area network (WLAN) 100 may include one or more access points (APs) 110 and one or more stations (STAs) 120a, 120b, 120c. The one or more STAs 120a, 120b, 120c may include one or more antennas 122a, 124a, 122b, 124b, 122c, 124c, or the like. One or more of STA 120a, 120b, 120c may include one or more antennas: (i) station 120a may include the one or more antennas 122a, 124a, (ii) station 120b may include the one or more antennas 122b, 124b, or (iii) station 120c may include the one or more antennas 122c, 124c.

Multi-user multiple input multiple output (UL MU-MIMO) precoding uses different functionality for uplink transmission (i.e., communication from the station to the access point) when compared to downlink transmission (i.e., communication from the access point to the station). The functionality used for UL MU-MIMO precoding also differs from the functionality used for UL MU-MIMO transmission without precoding.

The functionality for UL MU-MIMO, at the access point 110, may include one or more operations including: (i) preparing channel estimation (sounding) packets, (ii) performing channel sounding operations, (iii) performing channel estimation operations, (iv) performing precoder matrix calculation operations, (v) communicating precoder matrices to the one or more stations 120a, 120b, 120c, or (vi) receiving uplink transmission from the one or more stations 120a, 120b, 120c.

In one example, an AP 110 operable for wireless communication may include data processing hardware; and memory hardware in communication with the data processing hardware. The memory hardware may be operable to store instructions that, when executed on the data processing hardware, may cause the data processing hardware to perform operations.

The operations may include identifying, at the AP 110, one or more transmitting stations (e.g., STA1 120a, STA2 120b, STA3 120c). The one or more transmitting stations may include one or more spatial streams. That is, a transmitting station (e.g., STA1 120a, STA2 120b, STA3 120c) may be operable to transmit one or more spatial steams that may not exceed the number of transmit antennas for the transmitting station while also allowing for complete channel estimation without using one or more sounding packets. The AP 110 may be operable to determine spatial streams associated with the transmitting stations (e.g., STA1 120a, STA2 120b, STA3 120c). The AP 110 may be operable to determine the transmitting stations and the spatial streams for the transmitting stations for UL MU-MIMO transmission.

The operations may include sending, from the AP 110 to the one or more transmitting stations (e.g., STA1 120a, STA2 120b, STA3 120c), a sounding request. The AP 110 may define sounding settings and send the sounding request to the transmitting stations (e.g., STA1 120a, STA2 120b, STA3 120c) for which UL MU-MIMO transmission is to be received.

The operations may include performing, at the AP 110, MU-MIMO channel estimation based on the sounding request response. The AP 110 may evaluate the sounding packets that may be received after the sounding request and perform MU-MIMO channel estimation based on the sounding packets.

The operations may include computing, at the AP 110, MIMO transmission settings (e.g., modulation and coding scheme, streams, transmit power, bandwidth, frequency band of operation, or the like).

The operations may include computing, at the AP 110, one or more precoder coefficients for the one or more transmitting stations (e.g., STA1 120a, STA2 120b, STA3 120c) based on the MU-MIMO channel estimation. The one or more precoder coefficients may be in a precoder vector or a precoder matrix. The operations may further include computing, at the AP 110, a MIMO equalizer.

The operations may include sending, from the AP 110 to the one or more transmitting stations (e.g., STA1 120a, STA2 120b, STA3 120c), the one or more precoder coefficients. The AP 110 may send a trigger to the one or more transmitting stations to trigger uplink MU-MIMO transmission.

The operations may include receiving, at the AP 110, the uplink MU-MIMO transmissions from the one or more transmitting stations (e.g., STA1 120a, STA2 120b, STA3

120c). The MIMO equalizer may be updated and the data receiving from the transmitting stations may be decoded.

At the one or more transmitting stations (e.g., STA1 120a, STA2 120b, STA3 120c), the transmission operations, corresponding to the receiving operations at the AP 110, may be performed. The operations may include one or more of: (i) receiving, at the one or more transmitting stations (e.g., STA1 120a, STA2 120b, STA3 120c), the sounding request from the AP 110, (ii) transmitting, from the one or more transmitting stations (e.g., STA1 120a, STA2 120b, STA3 120c) to the AP 110, the sounding packet in response to the sounding request receiving from the AP 110, (iii) receiving, at the one or more transmitting stations (e.g., STA1 120a, STA2 120b, STA3 120c) from the AP 110, the one or more precoder coefficients and the UL MIMO transmission trigger, and (iv) communicating, from the one or more STAs to the AP 110, the UL MU-MIMO transmission.

In one example, a transmitting station (STA) (e.g., STA1 120a, STA2 120b, STA3 120c) operable for wireless communication may include data processing hardware, and memory hardware in communication with the data processing hardware. The memory hardware may store instructions that when executed on the data processing hardware may cause the data processing hardware to perform operations. The operations may include receiving, at the STA (e.g., STA1 120a, STA2 120b, STA3 120c) from an access point (AP) 110, a sounding request. The operations may include sending, from the STA (e.g., STA1 120a, STA2 120b, STA3 120c) to the AP 110, a sounding packet in response to the sounding request. The operations may include receiving, at the STA (e.g., STA1 120a, STA2 120b, STA3 120c) from the AP 110, one or more precoder coefficients. The operations may include receiving, at the STA (e.g., STA1 120a, STA2 120b, STA3 120c) from the AP 110, a transmission trigger. The operations may include encoding a data packet. The operations may include performing, at the STA (e.g., STA1 120a, STA2 120b, STA3 120c), MIMO precoding using the one or more precoder coefficients.

The foregoing operations at the AP 110 and the one or more transmitting stations (e.g., STA1 120a, STA2 120b, STA3 120c) may be performed at one or more of the transmitting stations when the transmitting stations are transmitting simultaneously.

Using one or more precoder coefficients for UL MU-MIMO data transmission from the one or more transmitting stations (e.g., STA1 120a, STA2 120b, STA3 120c) to the AP 110 may be operable to facilitate one or more of an upstream capacity increase, a data rate increase, a power consumption decrease, or a latency reduction compared to a baseline upstream capacity, a baseline data rate, a baseline power consumption, or a baseline latency when the one or more precoder coefficients are not used.

In one example, using the one or more precoder coefficients may increase the upstream capacity (e.g., as measured in Mbit/s) by one or more of: greater than 10%, greater than 20%, greater than 50%, greater than 100%, greater than 200%, or the like compared to a baseline upstream capacity (e.g., as measured in Mbit/s) when the one or more precoder coefficients are not used.

In one example, using the one or more precoder coefficients may increase the data rate (e.g., as measured in Mbit/s) by one or more of: greater than 10%, greater than 20%, greater than 50%, greater than 100%, greater than 200%, or the like compared to a baseline data rate (e.g., as measured in Mbit/s) when the one or more precoder coefficients are not used.

In one example, using the one or more precoder coefficients may decrease the power consumption (e.g., as measured in watt hours Wh) by one or more of: greater than 10%, greater than 20%, greater than 50%, greater than 80%, greater than 90%, or the like compared to a baseline power consumption (e.g., as measured in watt hours Wh) when the one or more precoder coefficients are not used.

In one example, using the one or more precoder coefficients may decrease the latency (e.g., as measured in seconds) by one or more of: greater than 10%, greater than 20%, greater than 50%, greater than 80%, greater than 90%, or the like compared to a latency (e.g., as measured in seconds) when the one or more precoder coefficients are not used. The latency may be the uplink transmission latency.

Transmission Procedure and Channel Estimation

Figure 2A:
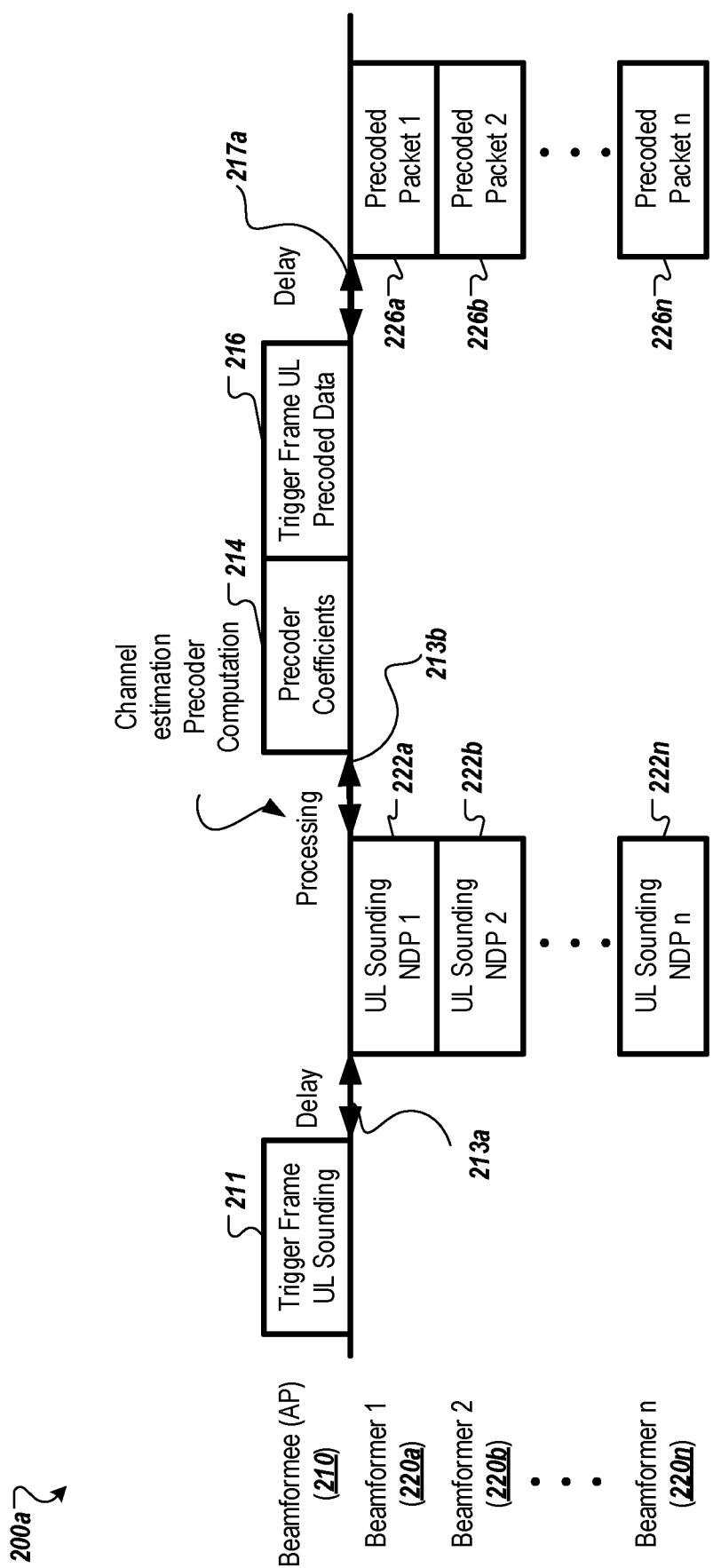
FIG. 2A illustrates an example packet sequence for uplink multi-user multiple input multiple output (UL MU-MIMO) precoding.
Figure 2B:
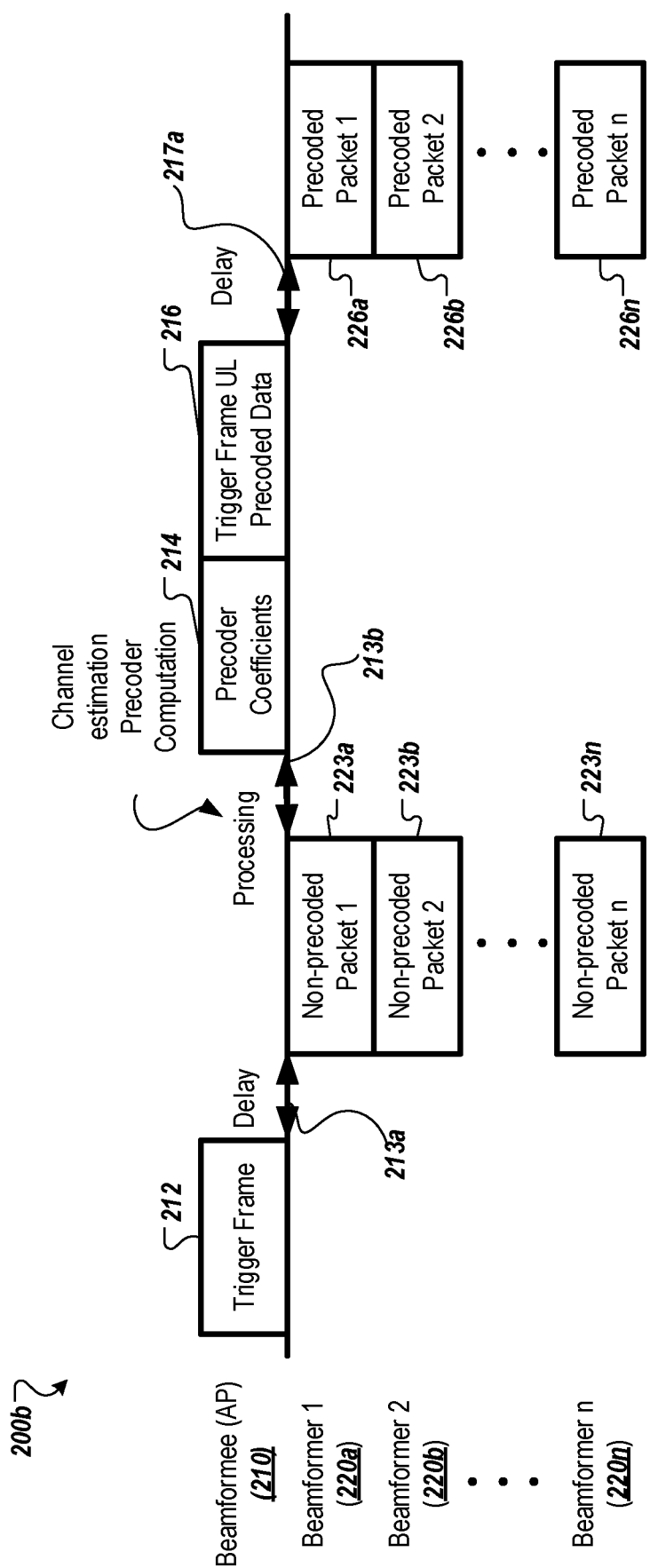
FIG. 2B illustrates an example packet sequence for UL MU-MIMO precoding with implicit channel estimation.
Figure 2C:
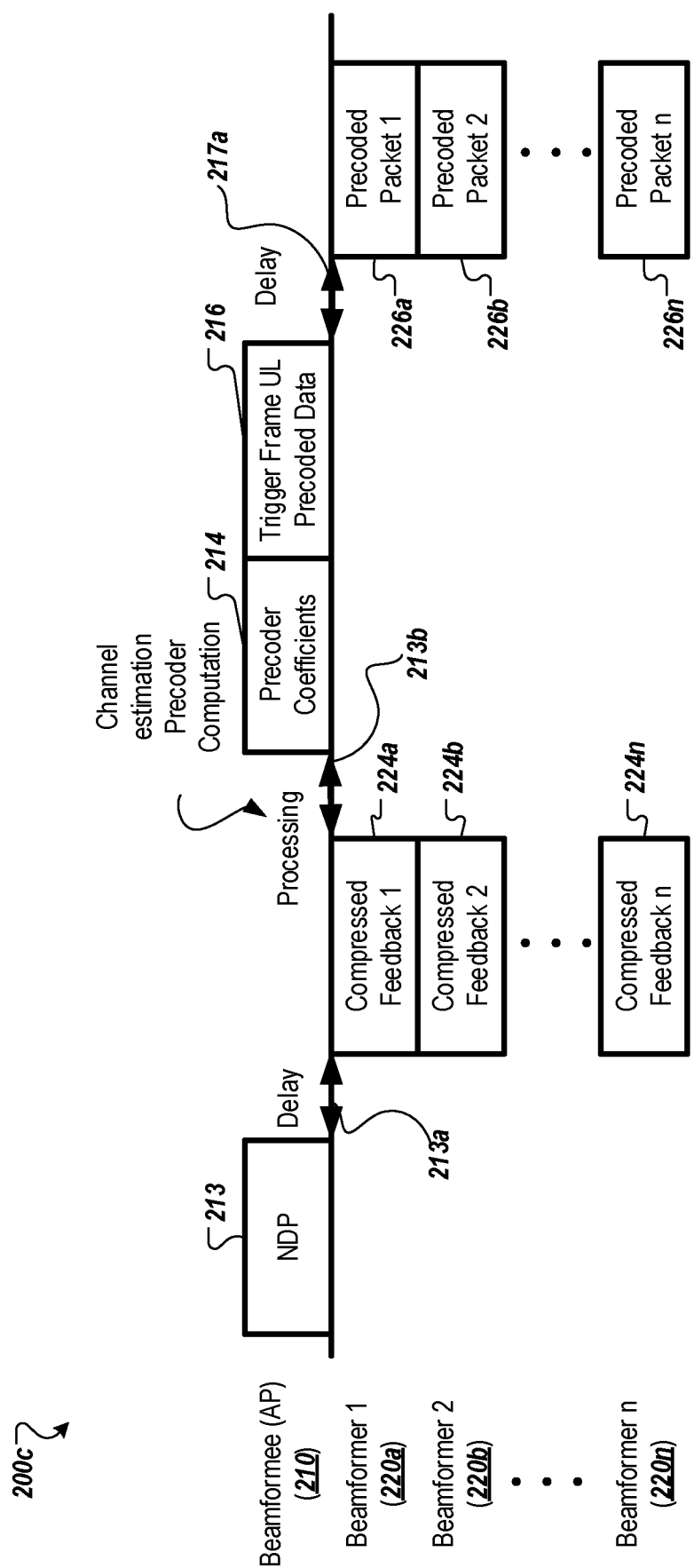
FIG. 2C illustrates an example packet sequence for UL precoding derived from a downstream channel estimation

As illustrated in FIGS. 2A to 2C, the operations performed at the AP 210 and the operations performed at the one or more transmitting stations 220a, 220b, 220n may include various dependencies.

A dedicated upstream sounding packet may be used to perform MU-MIMO channel estimation. In comparison to a downstream sounding packet, the transmission of a sounding packet from one or more stations may be triggered by the AP 210, which may include a configurable orthogonal sequence to be applied for one or more antennas of the one or more transmitting stations 220a, 220b, 220c. The one or more transmitting stations 220a, 220b, 220c may send a different orthogonal sequence to be able to separate the channels at the AP 210.

As illustrated in FIG. 2A, functionality 200a may be provided for an AP 210 which may perform MU-MIMO channel estimation based on one or more uplink sounding packets received from the one or more transmitting stations 220a, 220b, 220n. The AP may send a trigger frame including an UL sounding packet request to the one or more transmitting stations 220a, 220b, 220n, as shown in operation 211.

Following a delay 213a for the one or more transmitting stations 220a, 220b, 220n to receive the UL sounding packet request, the one or more transmitting stations 220a, 220b, 220n may send one or more UL sounding data packets, which may be null data packets (NDPs). The one or more UL sounding packets may include one or more of UL sounding NDP 1 222a, UL sounding NDP 2 222b, or UL sounding NDP 3 222c, which may be sent from the one or more transmitting stations 220a, 220b, 220n.

Following a processing time 213b for the AP 210 to receive the UL sounding packets from the one or more transmitting stations 220a, 220b, 220n, the AP 210 may use the channel estimation based on the UL sounding packets to compute the one or more precoder coefficients, as shown in operation 214. The AP may trigger UL transmission using a trigger frame UL and send the precoder coefficient data (e.g., the one or more precoder coefficients) to the one or more transmitting stations 220a, 220b, 220n, as shown by operation 216.

Following a delay 217a for the one or more transmitting stations 220a, 220b, 220n to receive the trigger frame UL and the precoder coefficient data, the one or more transmitting stations 220a, 220b, 220n may send the one or more precoded data packets (e.g., precoded packet 1 226a, precoded packet 2 226b, or precoded packet 3 226n) to the AP 210.

Implicit estimation may be used for channel estimation when the number of columns of the implicit channel estimation matrix is equal to the transmitted spatial streams $L=\Sigma_{users\ u}L_u$. Thus, a complete channel estimation may be used when the number of transmit antennas of the one or more transmitting stations 220a, 220b, 220n is not higher than the number of receive antennas of the AP 210, which may be the limit of the transmitted spatial streams L.

As illustrated in FIG. 2B, functionality 200b may be provided for an AP 210 which may perform implicit channel estimation using MU-MIMO channel estimation based on one or more uplink data transmissions received from the one or more transmitting stations 220a, 220b, 220n. The AP 210 may send a trigger frame to the one or more transmitting stations 220a, 220b, 220n, as shown in operation 212.

Following a delay 213a for the one or more transmitting stations 220a, 220b, 220n to receive the trigger frame, the one or more transmitting stations 220a, 220b, 220n may send one or more non-precoded packets, which may be non-precoded UL MU-MIMO packets. The one or more be non-precoded packets may include one or more of non-precoded packet 1 223a, non-precoded packet 223b, or non-precoded packet 223n, which may be sent from the one or more transmitting stations 220a, 220b, 220n to the AP 210.

Following a processing time 213b for the AP 210 to receive the non-precoded packets from the one or more transmitting stations 220a, 220b, 220n, the AP 210 may use the channel estimation based on the non-precoded packets to compute the one or more precoder coefficients, as shown in operation 214. The AP may trigger UL transmission using a trigger frame UL and send the precoder coefficient data (e.g., the one or more precoder coefficients) to the one or more transmitting stations 220a, 220b, 220n, as shown by operation 216.

Following a delay 217a for the one or more transmitting stations 220a, 220b, 220n to receive the trigger frame UL and the precoder coefficient data, the one or more transmitting stations 220a, 220b, 220n may send the one or more precoded data packets (e.g., precoded packet 1 226a, precoded packet 2 226b, or precoded packet 3 226n) to the AP 210.

As illustrated in FIG. 2C, functionality 200c may be provided for an AP 210 which may include a maximum number of spatial streams that may be received from the one or more transmitting stations 220a, 220b, 220n. When the number of transmit (tx) antennas of the one or more transmitting stations 220a, 220b, 220n which transmit simultaneously is higher than the maximum number of spatial streams that may be received by the AP 210, implicit channel estimation may be incomplete.

A downlink MU MIMO sounding procedure may be used as input for the upstream precoder computation. The dependency between uplink and downlink channel may be approximately $H_{up}^{(k)}=H_{down}^{(k),H}$. The compressed feedback report for downlink beamforming and precoding may not include the full channel matrices $H_{down}$. The compressed feedback report may include the signal to noise ratio (SNR) and V matrices from a singular value decomposition $U^{(k)}S^{(k)}V_{(k),H}=H_{down}^{(k)}$. down To implement the uplink MIMO precoding optimization from a downlink channel estimation, the V matrices may not provide adequate information and a full channel matrix (e.g., $H_{down}$) may be reported back from the one or more transmitting stations 220a, 220b, 220n in the compressed feedback report.

As illustrated in FIG. 2C, functionality 200c may be provided an AP 210 which may perform downlink channel estimation based on one or more compressed feedback reports (e.g., compressed feedback 1 224a, compressed feedback 2 224b, or compressed feedback n 224n) received from the one or more transmitting stations 220a, 220b, 220n.

The AP 210 may send a null data packet 213 to the one or more transmitting stations 220a, 220b, 220n. Following a delay 213a for the one or more transmitting stations 220a, 220b, 220n to receive the null data packet, the one or more transmitting stations 220a, 220b, 220n may send the one or more compressed feedback reports (e.g., compressed feedback 1 224a, compressed feedback 2 224b, or compressed feedback n 224n) to the AP 210.

Following a processing time 213b for the AP 210 to receive the compressed feedback reports (e.g., compressed feedback 1 224a, compressed feedback 2 224b, or compressed feedback n 224n) from the one or more transmitting stations 220a, 220b, 220n, the AP 210 may use the channel estimation based on the compressed feedback reports (e.g., compressed feedback 1 224a, compressed feedback 2 224b, or compressed feedback n 224n) to compute the one or more precoder coefficients, as shown in operation 214. The AP may trigger UL transmission using a trigger frame UL and send the precoder coefficient data (e.g., the one or more precoder coefficients) to the one or more transmitting stations 220a, 220b, 220n, as shown by operation 216.

Following a delay 217a for the one or more transmitting stations 220a, 220b, 220n to receive the trigger frame UL and the precoder coefficient data, the one or more transmitting stations 220a, 220b, 220n may send the one or more precoded data packets (e.g., precoded packet 1 226a, precoded packet 2 226b, or precoded packet 3 226n) to the AP 210.

Channel estimation may proceed after identification of the MIMO settings. For one or more carriers, the full uplink channel matrix may include $N_{tx}$ columns, which may be the sum of the transmit antennas of one or more transmitting stations 220a, 220b, 220n such that $N_{tx}=\Sigma_{users\ u}N_{tx,u}$ and $N_{rx}$ rows, which may be the number of receive antennas at the AP 210.

In one example, the AP may send, from the AP to the one or more transmitting stations, compressed precoder matrixes including: the one or more precoder coefficients, one or more frequency correction values, one or more phase correction values, or one or more timing correction values.

The AP 210 may facilitate further functionality to effectuate channel estimation. The AP may estimate the clock frequency differences between the one or more transmitting stations 220a, 220b, 220n and send a frequency correction to the one or more transmitting stations 220a, 220b, 220n to increase the timing accuracy between the one or more transmitting stations 220a, 220b, 220n compared to a baseline timing when the frequency correction is not used.

The AP 210, when the transmit time of the one or more transmitting stations 220a, 220b, 220n varies within the cyclic prefix, may estimate the timing differences between one or more transmitting stations 220a, 220b, 220n and send a timing correction for increased alignment between the one or more transmitting stations 220a, 220b, 220n compared to a baseline timing when the timing correction is not used.

The AP may determine a trade-off between sounding overhead and the accuracy of channel estimation. The AP may determine a threshold value for channel estimation accuracy and a threshold value for sounding overhead. The AP may perform various operations to increase the channel estimation accuracy greater than the channel estimation accuracy threshold and/or decrease the sounding overhead less than the sounding overhead threshold.

Sounding may be performed on one or more carriers, which may facilitate a greater channel estimation accuracy.

In some cases, when the sounding overhead is to be decreased, sounding may be used e.g., per second, $4^{th}$ carrier, or the like to maintain the channel estimation accuracy threshold. In some cases, the symbol length in time of the sounding symbol may be e.g., ½, ¼, ⅛, or the like of the regular symbol time.

MIMO Precoding and Equalization in Uplink Transmission

Figure 3:
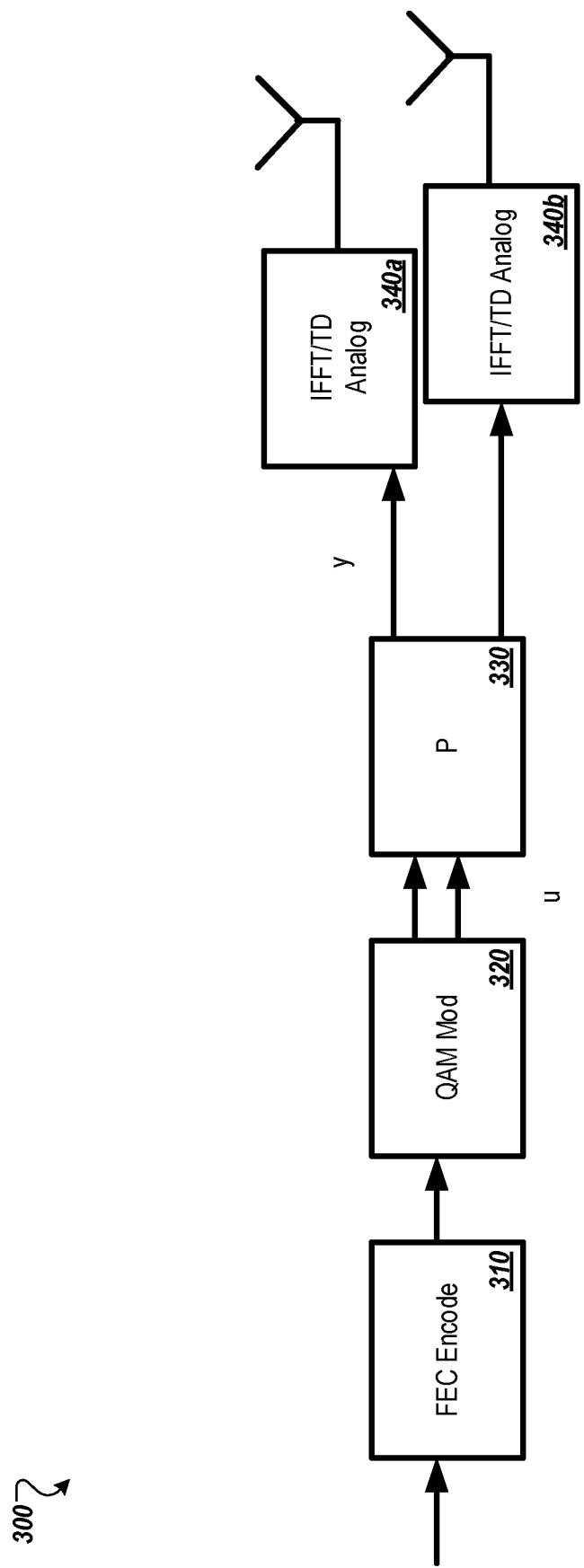
FIG. 3 illustrates an example block diagram of a UL MU-MIMO precoding STA.

As illustrated in FIG. 3, a block diagram 300 for the one or more transmitting stations operable for uplink MU MIMO precoding may include one or more of: (i) a forward error correction (FEC) encoder operation 310, (ii) a quadrature amplitude modulation (QAM) modulator operation 320, (iii) a precoding operation 330, or (iv) an inverse fast Fourier transform time domain (IFFT/TD) digital-to-analog conversion operation 340a, 340b. The one or more transmitting stations may include more than one antenna, e.g., two transmit antennas. The one or more transmitting stations may transmit one or more spatial streams up to the number of transmit antennas.

At the one or more transmitting stations, the uplink transmission may include an FEC encoder operation 310 and a QAM modulator operation 320. After the FEC encoder operation 310 and the QAM modulator operation 320, a non-precoded transmit signal vector $x_u^{(k)}$ for station u and subcarrier k of the orthogonal frequency division multiplexing (OFDM) multicarrier transmission may be generated. The non-precoded transmit signal may include one element per transmitting spatial stream $l=1, \ldots, L_u$. The transmit signal vectors of the one or more transmitting stations may be collected into a transmit signal vector $$x^{(k)} = \begin{bmatrix} x_1^{(k)} \\ \vdots \\ x_U^{(k)} \end{bmatrix}.$$

For the one or more transmitting stations, precoding with a precoder matrix $P_u^{(k)}$ may be performed for one or more carriers. With $N_{tx,u}$ transmit antennas, the matrix may be of size $N_{tx,u} \times L_u$. The precoder matrices of stations may be collected to the precoder matrix $$P^{(k)} = \begin{bmatrix} P_1^{(k)} & 0 & 0 \\ 0 & \ddots & 0 \\ 0 & 0 & P_U^{(k)} \end{bmatrix}.$$

After precoding, the transmission from a transmitting station (e.g., station n) of the one or more transmitting stations may be $y_u^{(k)} = P_u^{(k)} x_u^{(k)}$. Thus, the overall transmit signal from the one or more transmitting signals may be $y^{(k)} = P^{(k)} x^{(k)}$.

Figure 4:
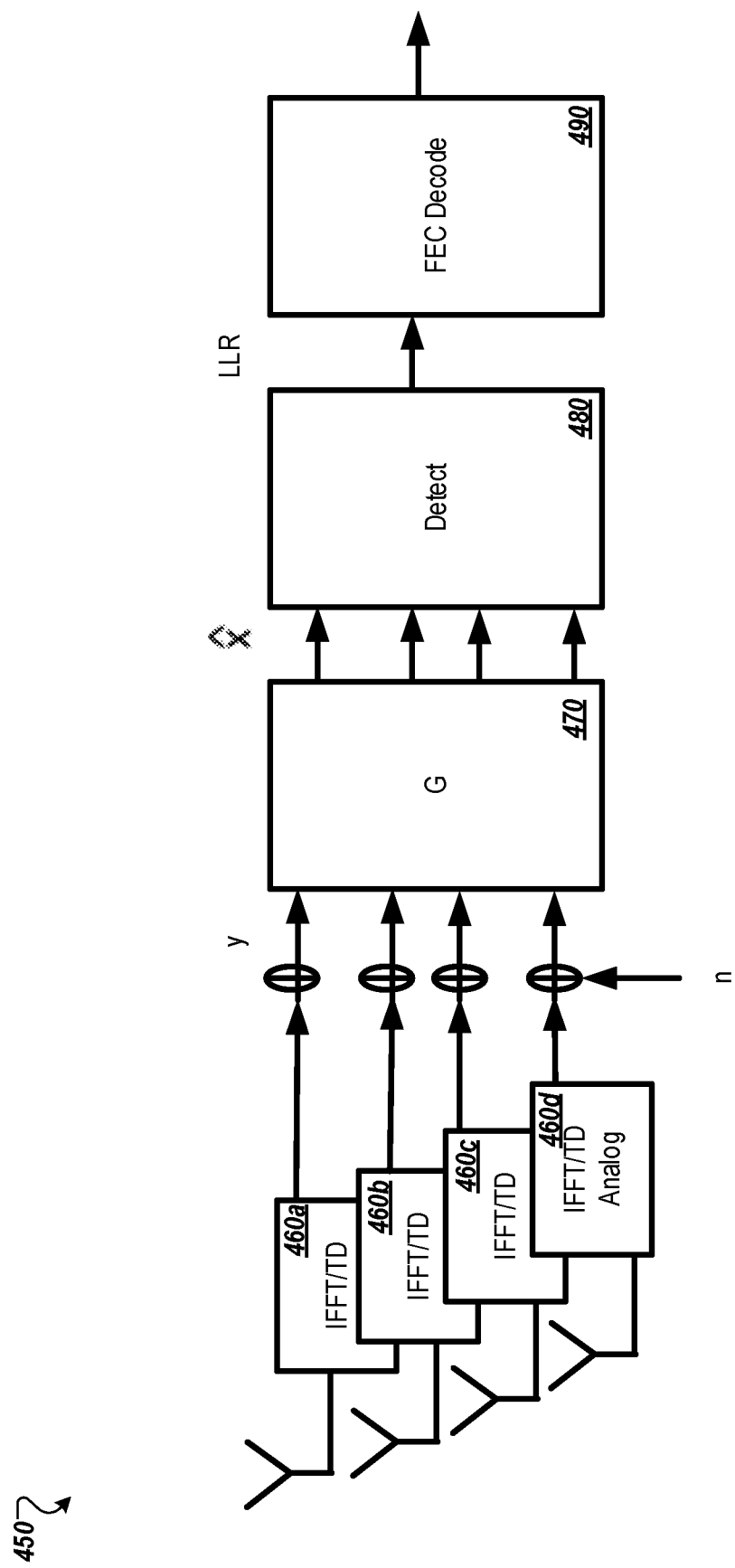
FIG. 4 illustrates an example block diagram of a UL MU-MIMO precoding AP.

As illustrated in FIG. 4, a block diagram 450 for the AP may include one or more of: (i) one or more IFFT/TD operations 460a, 460b, 460c, 460d, (ii) an equalizer operation 470, (iii) a detector operation 480, or (iv) an FEC decoder operation 490.

The transmit signal from the one or more transmitting stations may be received at the AP and may be provided $\hat{y}^{(k)} = H^{(k)} y^{(k)} + n^{(k)}$, in which the receiver noise may be $n^{(k)}$, the receive signal may be $\hat{y}^{(k)}$ of size $N_{rx} \times 1$, and the channel matrix $H^{(k)}$ may be of size $N_{rx} \times N_{tx}$ where $N_{tx} = \Sigma_u N_{tx,u}$. The receiver noise is not a part of the AP, and has been included because thermal noise may not be prevented.

The AP may apply the equalizer matrix $G^{(k)}$ of size $L \times N_{rx}$ where $L = \Sigma_u L_u$. The receive operation for carrier k may be provided by $$\widehat{x^{(k)}} = G^{(k)} \hat{y}_u^{(k)}.$$

The transmitted bits may be recovered using the detector operation 480 and the FEC decoder operation 490.

Many of the hardware components available at the AP may be available at the one or more transmitting stations and vice versa, e.g. for support of point-to-point MIMO transmission. At the AP, the equalizer G may be calculated while at the one or more transmitting stations, the precoder P may be calculated.

In the downlink direction (e.g., a communication from the AP to the one or more transmitting stations), the precoder calculation may be based on a compressed feedback report that may not include the full precoder matrix. The compressed feedback report may include compressed scaled amplitude and phase information. In the uplink direction (e.g., a communication from the one or more transmitting stations to the AP), the channel estimation and/or the precoder computation may be performed at the AP such that no communication of the channel estimation over the channel is used. The full channel matrix and noise estimate may be available for precoder calculation.

In one example, the AP may compute the one or more precoder coefficients using one or more of: minimum mean square error (MMSE), phase optimization, or power loading.

In one example, a weighted minimum mean squared error (W-MMSE) precoder computation may be performed. In one example, the precoder may be calculated based on the equalizer using uplink-downlink duality or the equalizer may be calculated based on the precoder using uplink-downlink duality.

The equalizer may be provided by $G^{(k)} = (H^{(k)} P^{(k)})^H ((H^{(k)} P^{(k)})(H^{(k)} P^{(k)})^H + C_n^{(k)})^{-1}$. The optimal precoder matrices may derived using uplink-downlink duality. Hereby, the dual uplink channel may be provided by $H_{up}^{(k)} = (G^{(k)} H^{(k)} \sigma^{-1})^H$. The dual uplink equalizer for spatial stream 1 may be provided by $g_{up,l}^T = \beta_l \sqrt{x_{u,l}} h_{up,l}^H$ $$g_{up,l}^T = \beta_l \sqrt{x_{u,l}} h_{up,l}^H \left( \sum_d h_{up,d} h_{up,d}^H x_{u,d} + Q \right)^{-1},$$

in which the dual uplink noise may be provided by $$Q = \begin{pmatrix} \mu_1 I & 0 & 0 \\ 0 & \ddots & 0 \\ 0 & 0 & \mu_U I \end{pmatrix}.$$

The optimal precoder matrices may be updated with respect to the transmit power constraint per station $$u: \sum_{k=1}^{K} tr(P_u^{(k)} P_u^{(k),H}) \le p_{sum,u}.$$

The variables $\mu_u$ may be updated according to: $\mu_{u,t+1} = \mu_{u,t} + \alpha(\Sigma_{carriers\ k} trace(P_u^{(k)} P_u^{(k),H}) - p_{sum,u})$.

The dual uplink equalizer matrix $$G_{up}^{(k)} = \begin{bmatrix} g_{up,1}^T \\ \vdots \\ g_{up,L}^T \end{bmatrix}$$

may be a dense matrix, while a block diagonal structure according to $$P^{(k)} = \begin{bmatrix} P_1^{(k)} & 0 & 0 \\ 0 & \ddots & 0 \\ 0 & 0 & P_U^{(k)} \end{bmatrix}$$

may be used. The conversion from the dense matrix to the block diagonal structure may be achieved by setting the off-diagonal elements to zero in one or more uplink-downlink duality iterations.

In the dual uplink, the transmit power may be optimized according to $$x_{up,l} = \max\left(\frac{w_l/\log 2}{1 + \sum_{d \neq l} \frac{x_{up,d} w_d/\log 2}{1 + x_{up,d} h_{u,d}^H A_d^{-1} h_{u,d}} |h_{up,d}^H A_d^{-1} h_{u,l}|^2} - \frac{1}{h_{up,l}^H A_l^{-1} h_{up,l}}, 0\right)$$

where $A_l$ is defined as $A_l = Q + \sum_{d \neq l} h_{up,d} h_{up,d}^H x_{up,d}$. With multiple updates of $x_{up,l}$ and $A_l$ the uplink power allocation may converge quickly. With the help of the conversion matrix Z, which is defined as $$z_{ld} = \begin{cases} g_{up,l}^T \mu \operatorname{conj}(g_{up,l}) + \sum_{j \neq l} x_{up,j} |g_{up,l}^T h_{up,j}|^2 & \text{for } l = d \\ -x_{up,d} |g_{up,d}^T h_{up,l}|^2 & \text{for } d \neq l \end{cases}$$

the uplink power allocation may be transformed into downlink power allocation using $x = Z^{-1} x_{up}$. The precoder matrix may be defined as $P = G_u^H \operatorname{diag}([\sqrt{x_1}, \ldots, \sqrt{x_L}])$.

Depending on the modulation and coding scheme (MCS) used for the one or more transmitting stations, the SNR on a certain carrier and spatial stream may be limited to a maximum value $SNR_{max}$ to avoid high transmit power at a certain carrier and spatial stream. Avoiding high transmit power may be achieved by adjusting the weights $w_{l,t+1}$ according to $$w_{l,t+1} = \min\left(w_{l,t} \frac{\alpha + SNR_{max}}{\alpha + SNR_l}, 1\right).$$

After a few iterations of precoder and equalizer update with updated weights w and µ, the equalizer and/or the precoder will converge to the MMSE solution.

Figure 5:
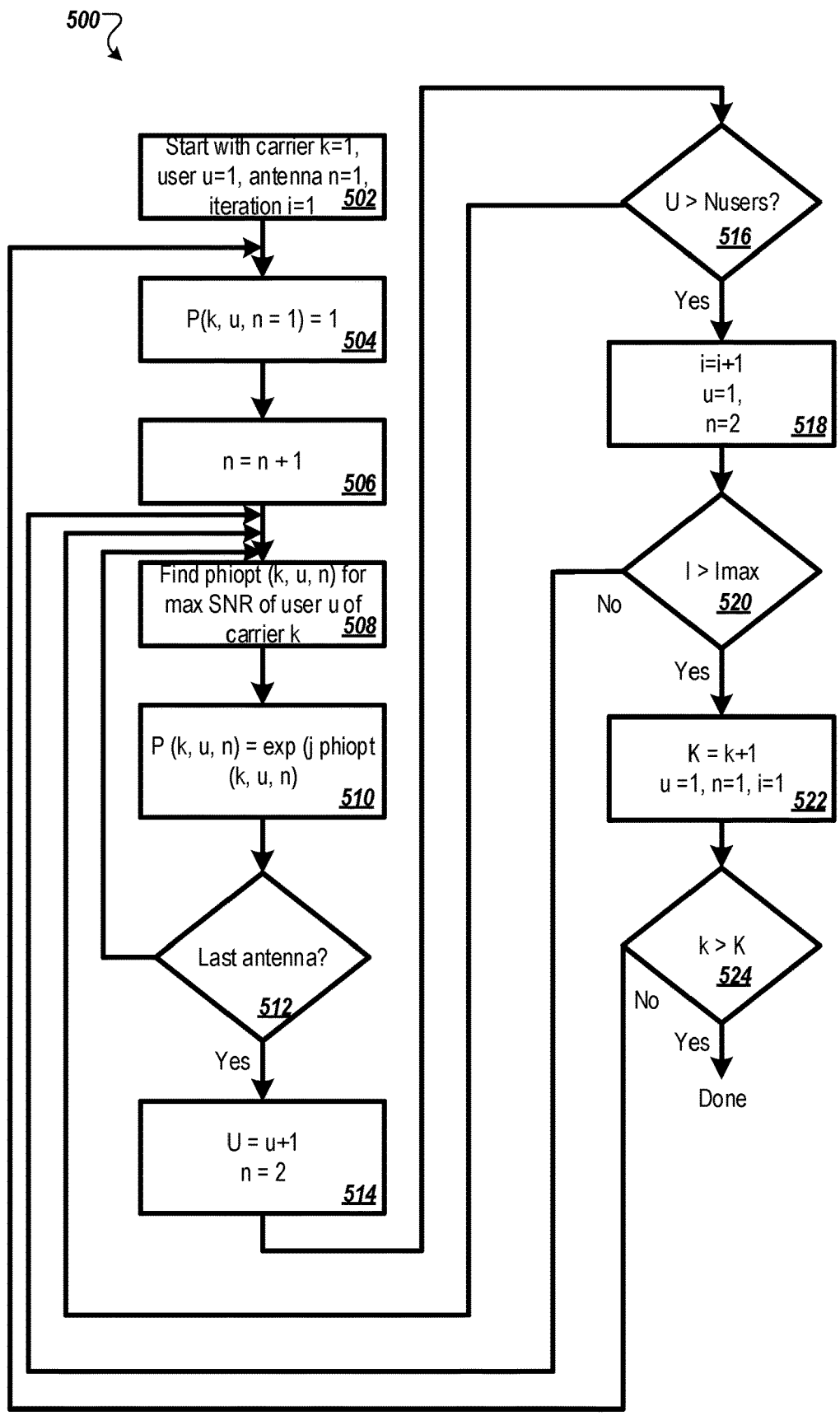
FIG. 5 illustrates an example phase optimization flow.

In one example, the AP may compute the one or more precoder coefficients using a phase optimization computation, as illustrated in FIG. 5. When a single spatial stream per station is used, and the one or more transmitting stations include two or more antennas per station, an optimization method based on phase optimization may be used.

The individual precoder of one or more stations may be provided by $$p_u^{(k)} = \begin{bmatrix} 1 \\ e^{j\varphi_{u1}^{(k)}} \\ \vdots \\ e^{j\varphi_{uNtx-1}^{(k)}} \end{bmatrix}.$$

The AP may perform phase optimization using a sequential one-dimensional search, as illustrated in FIG. 5. The optimum phase values $\varphi_{un}^{(k)}$ may be found by sequential 1-dimensional searches. The search may be performed for one or more of the user's precoders for antenna n=2, . . . , $N_{tx}$ and for one or more carrier k. When the optimization uses more iterations to converge, multiple iterations i=1, . . . , Nit may be performed for one or more carrier k.

The phase optimization process may include various operations including one or more of: (i) initializing a carrier at k=1, a user at u=1, an antenna at n=1, and an iteration at i=1, as shown in operation 502, (ii) setting a precoder for a carrier at k=1, a user at u=1, an antenna at n=1 to be equal to 1, as shown in operation 504, (iii) increasing the antenna number by 1, as shown in operation 506, (iv) computing optimal phase values (phiopt (k, u, n) for a maximum signal to noise ratio of user u of carrier k, as shown by operation 508, (v) computing the precoder coefficients as a function of the carrier, the user, and the antenna using: P (k, u, n)=exp (j phiopt (k, u, n)), as shown by operation 510, (vi) as shown by operation 512, determining if the last antenna has been reached, and, when the last antenna has been reached, proceeding to operation 514, or, when the last antenna has not been reached, proceeding back to operation 508, (vii) as shown by operation 516, increasing the user number by 1 and setting the antenna number to 2 when the last antenna has been reached, (viii) as shown by operation 516, determining when the user number is greater than the number of users, and, when the user number is greater than the number of users, proceeding to operation 518, or, when the user number is not greater than the number of users, proceeding back to operation 508, (ix) as shown by operation 518, increasing the iteration number by 1, setting the user number to 1, and setting the antenna number to 2, (x) as shown by operation 520, determining when the iteration number is greater than the maximum number of iterations, and, when the iteration number is greater than the maximum number of iterations, proceeding to operation 522, or, when the iteration number is greater than the maximum number of iterations, proceeding to operation 508, (xi) as shown by operation 522, increasing the carrier number by 1 and setting the user number to 1, setting the antenna number to 1, and setting the iteration number to 1, or (xii) as shown by operation 524, determining when the number of carriers is greater than the maximum number of carriers, and when the number of carriers is greater than the maximum number of carriers, then proceeding to complete the phase optimization process, or, when the number of carriers is not greater than the maximum number of carriers, then proceeding to operation 508.

The phase optimization process may be followed by a gain optimization (power loading). In one example, the AP may compute the one or more precoder coefficients using a power loading computation. The power loading may be performed at the AP for the one or more transmitting stations and the gains may be reported to the stations. For power loading at the AP side, one gain value per spatial stream and carrier may be reported.

Alternatively or in addition, the gain optimization may be performed by the one or more transmitting stations and the receive SNR may be reported to the one or more transmitting stations for gain optimization. The one or more transmitting stations may receive, at the STA from the AP, a signal to noise ratio (SNR) for a spatial stream. The one or more transmitting stations may perform, at the STA, gain optimization using the SNR. When power optimization is performed at the STA side, the SNR per spatial stream and carrier may be reported from the AP.

Reduction of the precoder message may be achieved by reporting on a periodic basis. That is, reporting may be performed once per nth instance, e.g., per second, per $4^{th}$ carrier, or the like.

Precoder Coefficient Communication

For UL MU-MIMO, the precoder coefficients to be used by the one or more transmitting stations, may be transmitted to the one or more transmitting stations. The precoder coefficients may include amplitude and/or phase of the precoder coefficients.

To achieve high quality and low transmission overhead, an efficient transmission scheme may be used. Various transmission parameters may be communicated from the AP to the one or more transmitting stations. An AP may send, from the AP to the one or more transmitting stations, various transmission parameters including one or more of: a power normalization value, a clock frequency, a clock phase, a clock start time correction value, a number of spatial streams, a number of transmit antennas, antenna indices of transmit antennas, a number of bits for coefficient amplitude, a number of bits for coefficient phase, amplitude values for precoder coefficients, phase values for precoder coefficients, real values for precoder coefficients, or imaginary values for precoder coefficients.

The power normalization value may be the sum power. Alternatively or in addition, the power normalization value may be the maximum coefficient amplitude, e.g., in terms of the square root of the power such that the communicated amplitude values may be normalized to one.

One or more of the clock frequency, the clock phase, or the clock start time may be estimated by the AP between the one or more transmitting station, which may be sent a correction value in terms of one or more of a relative phase, a frequency correction value, or the like.

Various processes may be used to reduce signaling overhead without a loss of transmission quality. The quantization of the one or more precoder coefficients may be based on a modulation and coding scheme (MCS). Alternatively or in addition, the AP may send, from the AP to the one or more transmitting stations, transmission parameters including a first set of transmission parameters and a second set of transmission parameters. The first set of transmission parameters may be sent using high-bit resolution when the transmission uses a high MCS compared to a baseline MCS and the second set of transmission parameters may be sent using a low-bit resolution when the transmission uses a low MCS compared to a baseline MCS. The high-bit resolution may use more bits than the low-bit resolution.

Other processes that may be used to reduce signaling overhead without a loss of transmission quality may include using predetermined values for stations. An AP may assign, at the AP from the one or more transmitting stations, a predetermined phase value for a station. To reduce the size, the phase of the first coefficient for one or more stations on one or more carriers may be assigned to be 1 without a loss of performance. Alternatively or in addition, the AP may report, from the AP to the one or more transmitting stations, the one or more precoder coefficients based on a difference between consecutive carriers. Reporting using a difference between consecutive carriers may reduce the number of bits that may be used. Alternatively or in addition, the AP may report, from the AP to the one or more transmitting stations, the one or more precoder coefficients using subcarrier grouping. That is, to reduce the size of the precoder matrices packet, the precoder may be reported on a periodic basis, e.g., per $n^{th}$ basis which may be per $2^{nd}$ subcarrier, per $4^{th}$ subcarrier, or the like.

Figure 6:
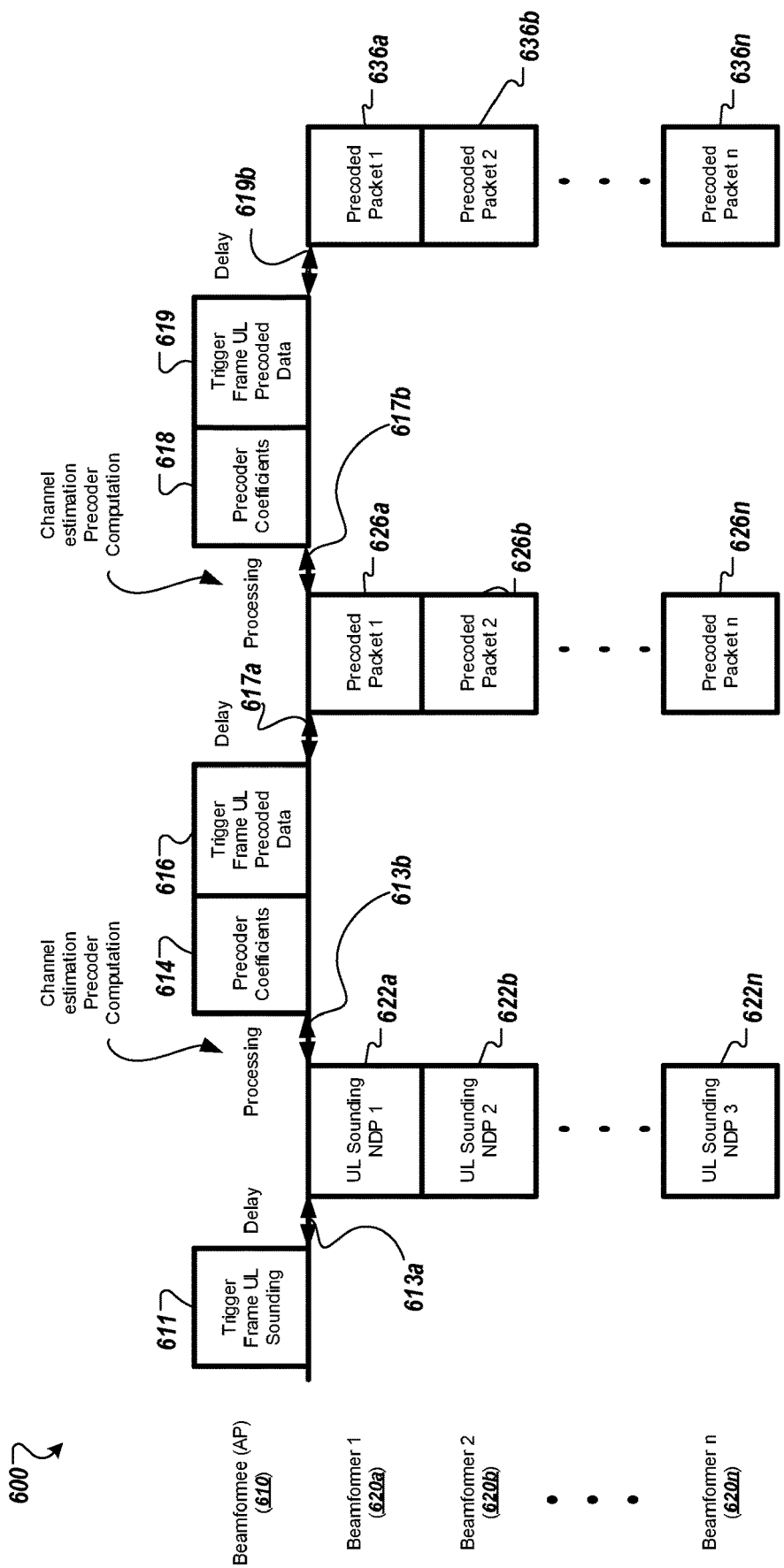
FIG. 6 illustrates an example packet sequence for consecutive UL MU-MIMO precoded transmissions.

As illustrated by the functionality 600 in FIG. 6, when there are multiple consecutive transmissions to the same stations, then an NDP transmission may not be used because the packet header of the precoded uplink packets may be used to estimate the channel for the precoder matrix computation and/or update.

An AP 610 may receive, at the AP 610 from one or more transmitting station 620a, 620b, 620n, one or more MU-MIMO precoded transmissions (e.g., precoded packet 1 626a, precoded packet 2 626b, precoded packet 3 626n, precoded packet 1 636a, precoded packet 2 636b, precoded packet 3 636n). The AP 610 may update, at the AP 610, the one or more precoder coefficients based on the one or more MU-MIMO precoded transmissions (e.g., precoded packet 1 626a, precoded packet 2 626b, precoded packet 3 626n, precoded packet 1 636a, precoded packet 2 636b, precoded packet 3 636n) to generate one or more updated precoder coefficients. The AP may send, from the AP to the one or more transmitting stations, the updated precoder coefficients.

The one or more transmitting stations 620a, 620b, 620n may send, from the STA 620a, 620b, 620n to the AP 610, one or more MU-MIMO precoded transmissions (e.g., precoded packet 1 626a, precoded packet 2 626b, precoded packet 3 626n, precoded packet 1 636a, precoded packet 2 636b, precoded packet 3 636n), and receive, at the STA 620a, 620b, 620n from the AP 610, updated precoder coefficients based on the MU-MIMO precoded transmissions (e.g., precoded packet 1 626a, precoded packet 2 626b, precoded packet 3 626n, precoded packet 1 636a, precoded packet 2 636b, precoded packet 3 636n).

The AP 610 may send, to the one or more transmitting stations 620a, 620b, 620n, a trigger frame and may request UL sounding packets, as shown in operation 611. Following a delay 613a, the one or more transmitting stations 620a, 620b, 620n may send one or more UL sounding NDPs (UL Sounding NDP 1 622a, UL sounding NDP 2 622b, UL sounding NDP 3 622n) to the AP 610. Following a processing time 613b, the access point may use channel estimation for precoder computation and generate precoder coefficients, as shown in operation 614. The access point 610 may trigger a frame UL and send precoded data to the one or more transmitting stations 620a, 620b, 620n, as shown in operation 616. Following a delay 617a, the one or more transmitting stations may send one or more MU-MIMO precoded transmissions (e.g., precoded packet 1 626a, precoded packet 2 626b, precoded packet 3 626n) to the access point.

Using these one or more MU-MIMO precoded transmissions (e.g., precoded packet 1 626a, precoded packet 2 626b, precoded packet 3 626n) received from the one or more transmitting stations 620a, 620b, 620n, after a processing time 617b, the access point may use channel estimation (based on the one or more MU-MIMO precoded transmissions) for precoder computation and to compute precoder coefficients, as shown by operation 618. The access point

610 may trigger a frame UL from the one or more transmitting stations 620a, 620b, 620n and send precoded data to the one or more transmitting stations 620a, 620b, 620n, as shown in operation 619. Following a delay 619b, the one or more transmitting stations 620a, 620b, 620n may send additional MU-MIMO precoded transmissions (e.g., precoded packet 1 636a, precoded packet 2 636b, precoded packet 3 636n) to the access point. Therefore, using the one or more MU MIMO precoded transmissions (e.g., precoded packet 1 626a, precoded packet 2 626b, precoded packet 3 626n) in precoder matrix computation and/or in precoder coefficient computation may reduce the overhead and/or processing time. In one example, to reduce overhead, a precoder update may be transmitted as difference $\Delta P = P^r - P^{r-1}$ which may use a reduced number of bits compared to a baseline case in which the full precoder matrix is communicated.

Figure 7:
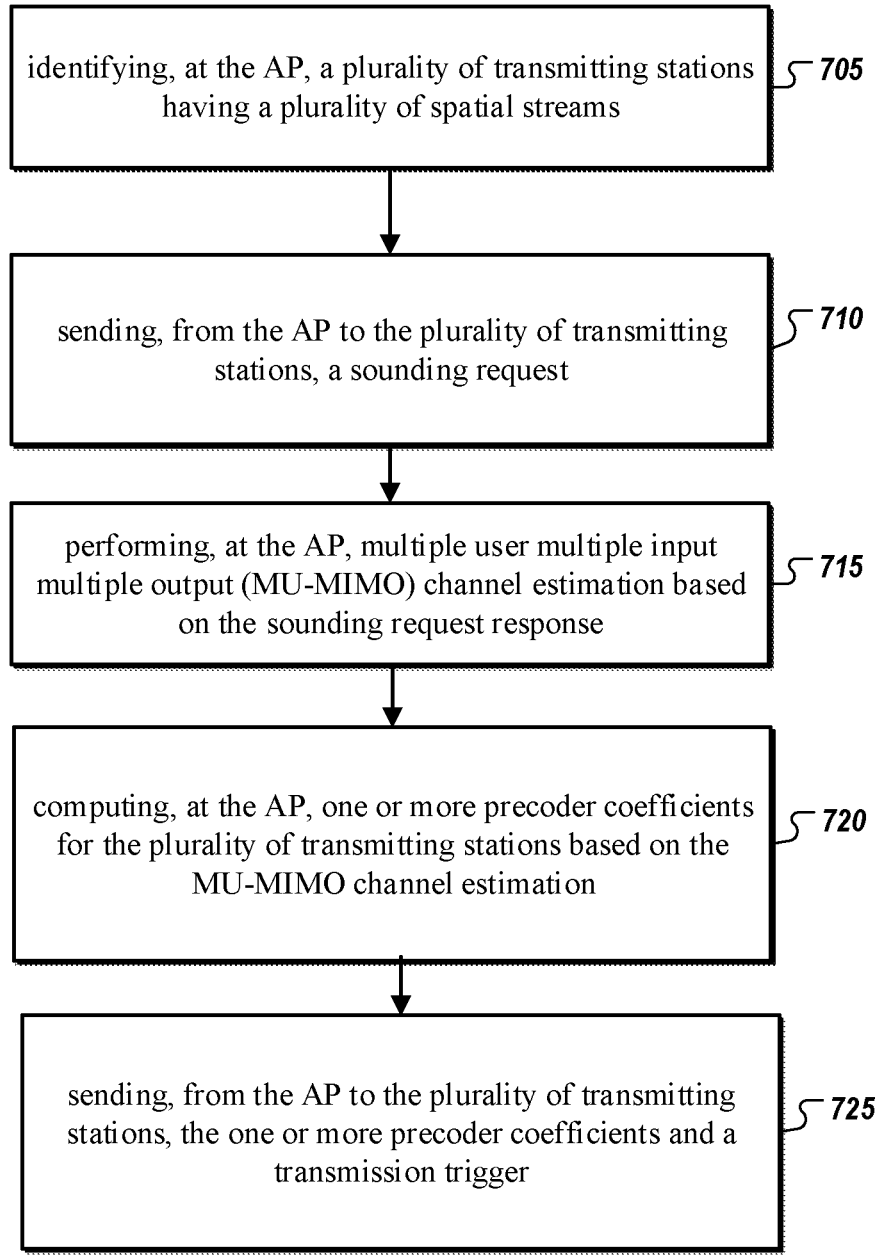
FIG. 7 illustrates an example process flow of an access point operable to receive UL MU-MIMO transmissions.

FIG. 7 illustrates a process flow of an example method 700 of UL MU-MIMO transmission, in accordance with at least one example described in the present disclosure. The method 700 may be arranged in accordance with at least one example described in the present disclosure.

Figure 10:
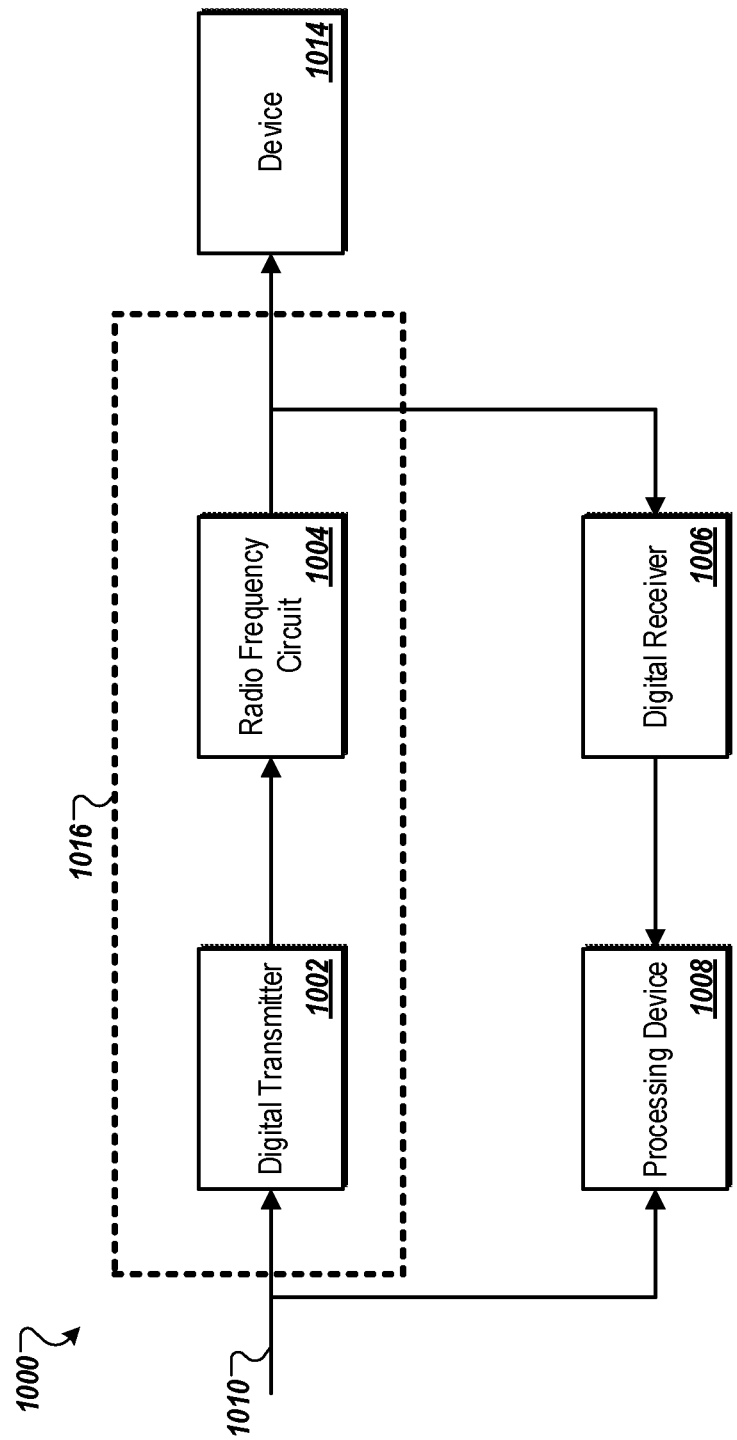
FIG. 10 illustrates an example communication system operable for UL MU-MIMO transmissions.
Figure 11:
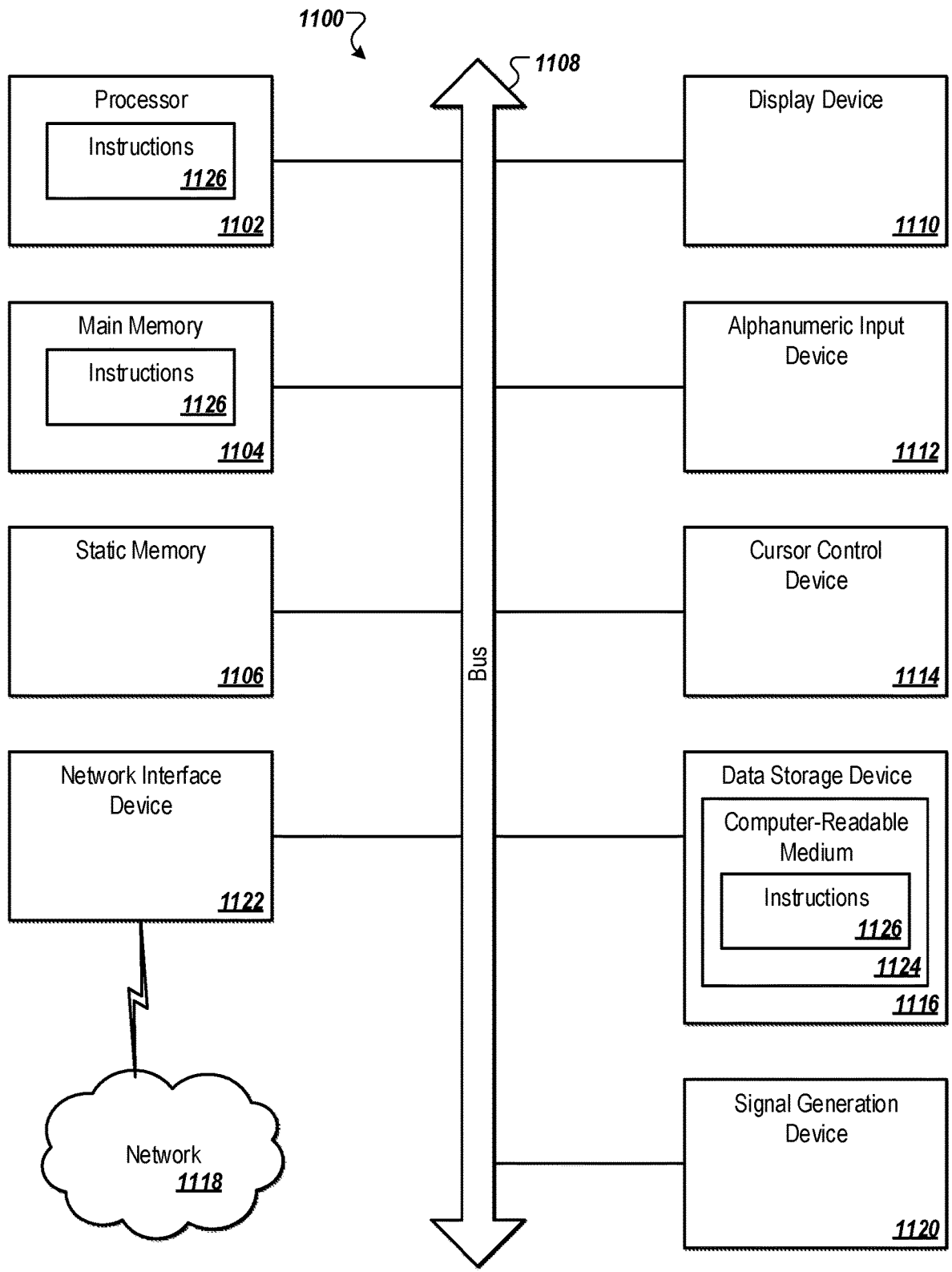
FIG. 11 illustrates a diagrammatic representation of a machine in the example form of a computing device within which a set of instructions, for causing the machine to perform any one or more of the methods discussed herein, may be executed.
Figure 12:
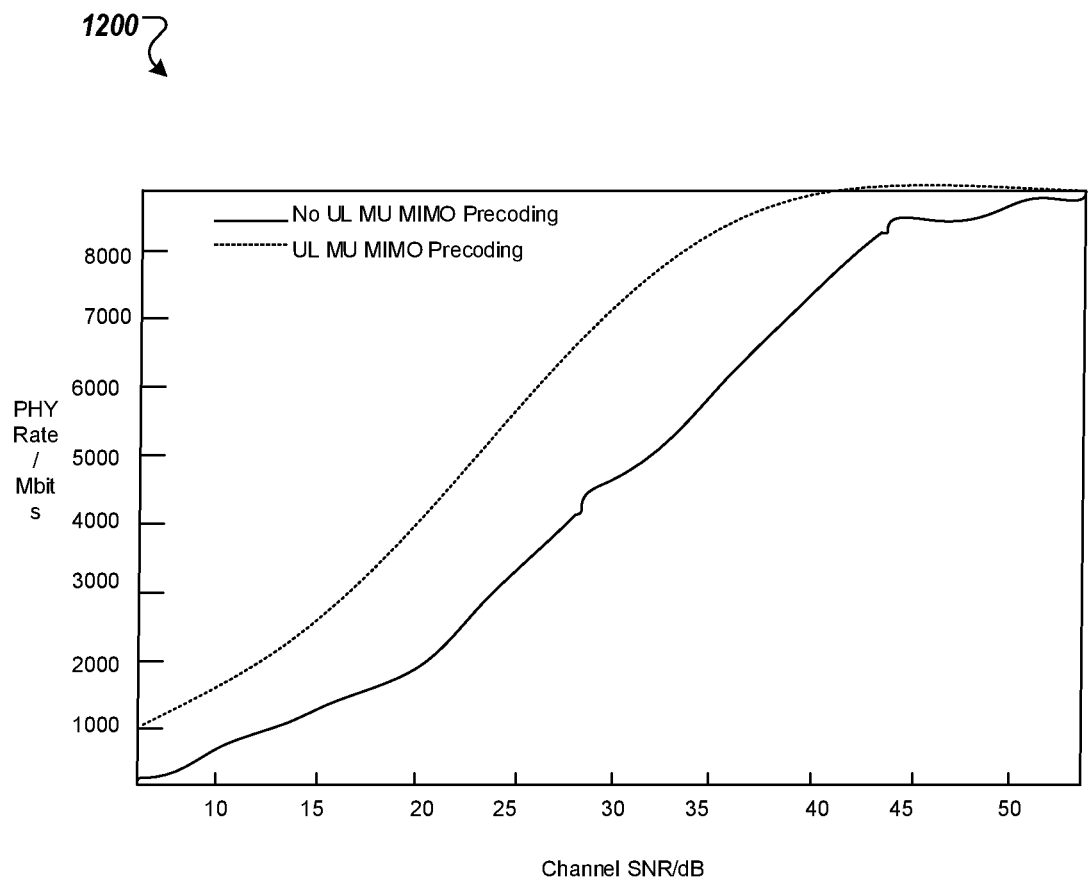
FIG. 12 illustrates performance results comparing precoding without UL MU-MIMO and precoding with UL MU-MIMO.

The method 700 may be performed by processing logic that may include hardware (circuitry, dedicated logic, etc.), software (such as is run on a computer system or a dedicated machine), or a combination of both, which processing logic may be included in the processing device (e.g., processor) 1102 of FIG. 11, the communication system 1000 of FIG. 10, or another device, combination of devices, or systems.

The method 700 may begin at block 705 where the processing logic may include identifying, at the AP, one or more transmitting stations having one or more spatial streams.

At block 710, the processing logic may include sending, from the AP to the one or more transmitting stations, a sounding request.

At block 715, the processing logic include performing, at the AP, multiple user multiple input multiple output (MU-MIMO) channel estimation based on a sounding request response.

At block 720, the processing logic may include computing, at the AP, one or more precoder coefficients for the one or more transmitting stations based on the MU-MIMO channel estimation.

At block 725, the processing logic may include sending, from the AP to the one or more transmitting stations, the one or more precoder coefficients and a transmission trigger.

Modifications, additions, or omissions may be made to the method 700 without departing from the scope of the present disclosure. For example, in some examples, the method 700 may include any number of other components that may not be explicitly illustrated or described.

Figure 8:
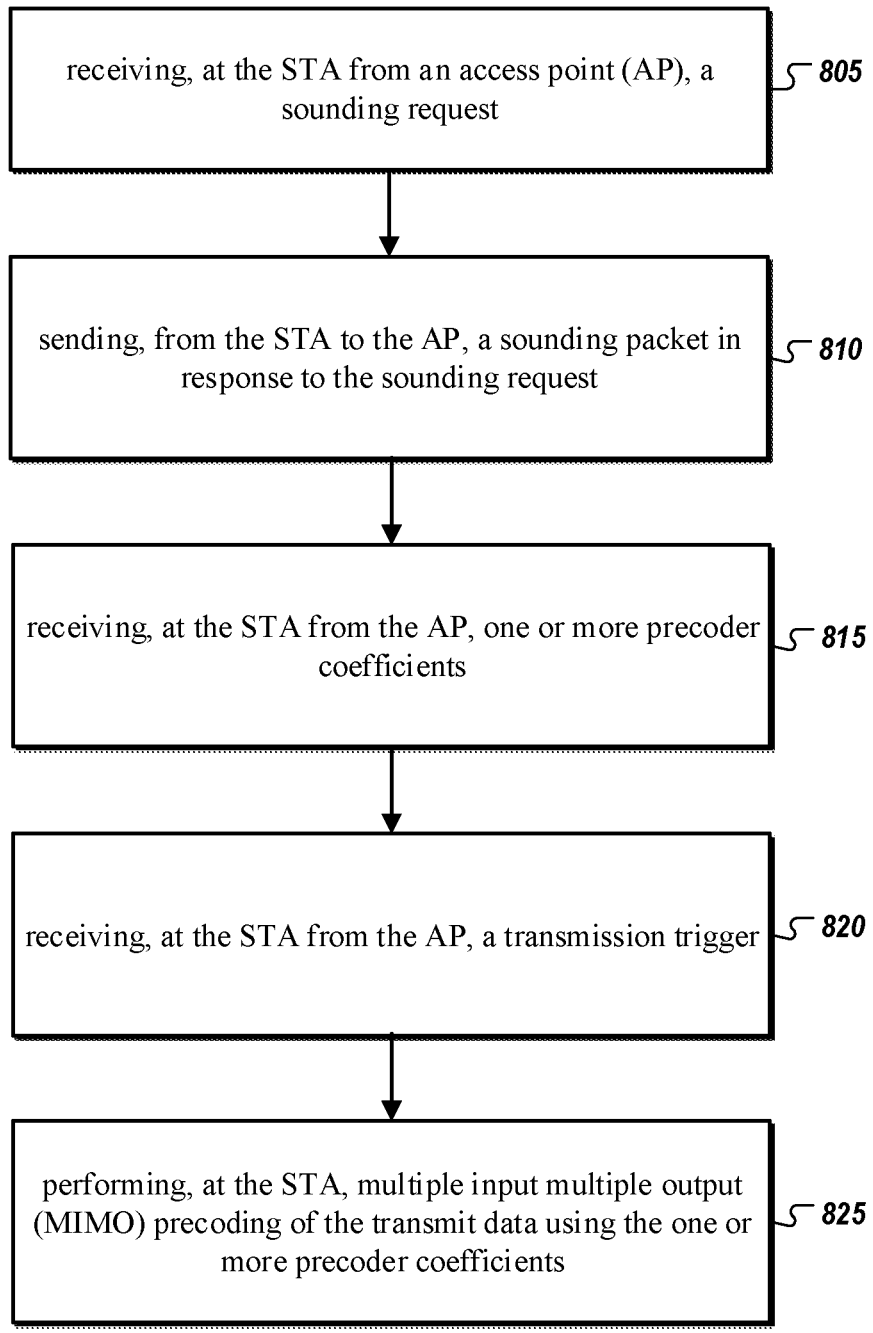
FIG. 8 illustrates an example process flow of a STA operable to send UL MU-MIMO transmissions.

FIG. 8 illustrates a process flow of an example method 800 that may be used for UL MU-MIMO transmission, in accordance with at least one example described in the present disclosure. The method 800 may be arranged in accordance with at least one example described in the present disclosure.

The method 800 may be performed by processing logic that may include hardware (circuitry, dedicated logic, etc.), software (such as is run on a computer system or a dedicated machine), or a combination of both, which processing logic may be included in the processing device (e.g., processor) 1102 of FIG. 11, the communication system 1000 of FIG. 10, or another device, combination of devices, or systems.

The method 800 may begin at block 805 where the processing logic may include receiving, at the STA from an access point (AP), a sounding request.

At block 810, the processing logic may include sending, from the STA to the AP, a sounding packet in response to the sounding request.

At block 815, the processing logic may include receiving, at the STA from the AP, one or more precoder coefficients.

At block 820, the processing logic may include receiving, at the STA from the AP, a transmission trigger.

At block 825, the processing logic may include performing, at the STA, multiple input multiple output (MIMO) precoding using the precoder matrix.

Modifications, additions, or omissions may be made to the method 800 without departing from the scope of the present disclosure. For example, in some examples, the method 800 may include any number of other components that may not be explicitly illustrated or described.

Figure 9:
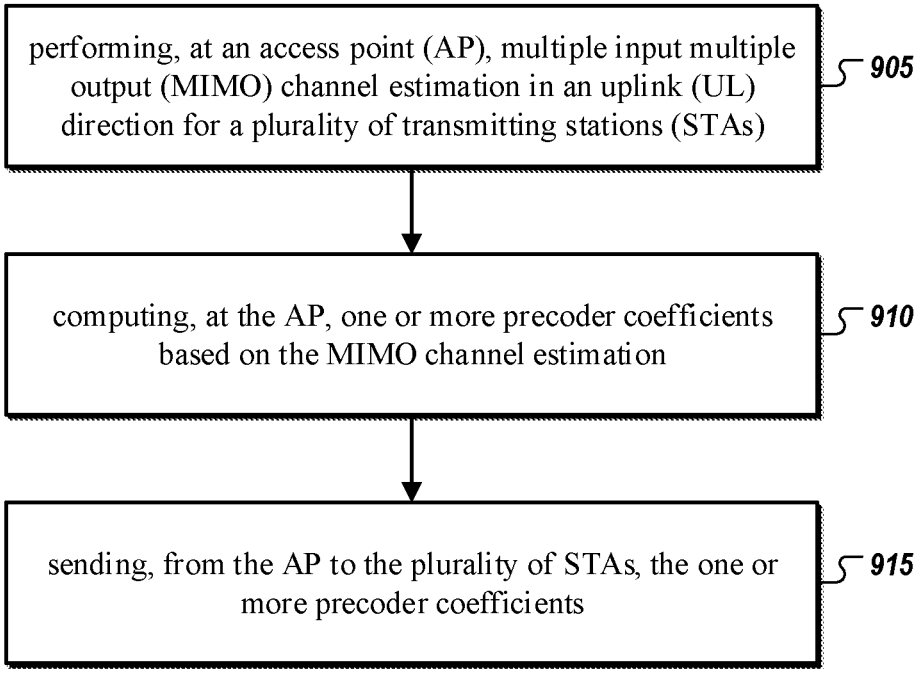
FIG. 9 illustrates an example process flow of method for UL MU-MIMO transmissions.

FIG. 9 illustrates a process flow of an example method 900 that may be used for UL MU-MIMO transmission, in accordance with at least one example described in the present disclosure. The method 900 may be arranged in accordance with at least one example described in the present disclosure.

The method 900 may be performed by processing logic that may include hardware (circuitry, dedicated logic, etc.), software (such as is run on a computer system or a dedicated machine), or a combination of both, which processing logic may be included in the processing device (e.g., processor) 1102 of FIG. 11, the communication system 1000 of FIG. 10, or another device, combination of devices, or systems.

The method 900 may begin at block 905 where the processing logic may include performing, at an access point (AP), multiple input multiple output (MIMO) channel estimation in an uplink (UL) direction for one or more transmitting stations (STAs).

At block 910, the processing logic may include computing, at the AP, one or more precoder coefficients based on the MIMO channel estimation.

At block 915, the processing logic may include sending, from the AP to the one or more STAs, the one or more precoder coefficients.

The method may include performing, at the AP, the MIMO channel estimation based on one or more of an uplink sounding packet or an uplink data transmission. The method may include computing, at the AP, one or more precoder coefficients using one or more of: minimum mean square error (MMSE), phase optimization, or power loading.

Modifications, additions, or omissions may be made to the method 900 without departing from the scope of the present disclosure. For example, in some examples, the method 900 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices.

The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 10 illustrates a block diagram of an example communication system 1000 configured for AP interference reduction, in accordance with at least one example described in the present disclosure. The communication system 1000 may include a digital transmitter 1002, a radio frequency circuit 1004, a device 1014, a digital receiver 1006, and a processing device 1008. The digital transmitter 1002 and the processing device may be configured to receive a baseband signal via connection 1010. A transceiver 1016 may include the digital transmitter 1002 and the radio frequency circuit 1004.

In some examples, the communication system 1000 may include a system of devices that may be configured to communicate with one another via a wired or wireline connection. For example, a wired connection in the communication system 1000 may include one or more Ethernet cables, one or more fiber-optic cables, and/or other similar wired communication mediums. Alternatively, or additionally, the communication system 1000 may include a system of devices that may be configured to communicate via one or more wireless connections. For example, the communication system 1000 may include one or more devices configured to transmit and/or receive radio waves, microwaves, ultrasonic waves, optical waves, electromagnetic induction, and/or similar wireless communications. Alternatively, or additionally, the communication system 1000 may include combinations of wireless and/or wired connections. In these and other examples, the communication system 1000 may include one or more devices that may be configured to obtain a baseband signal, perform one or more operations to the baseband signal to generate a modified baseband signal, and transmit the modified baseband signal, such as to one or more loads.

In some examples, the communication system 1000 may include one or more communication channels that may communicatively couple systems and/or devices included in the communication system 1000. For example, the transceiver 1016 may be communicatively coupled to the device 1014.

In some examples, the transceiver 1016 may be configured to obtain a baseband signal. For example, as described herein, the transceiver 1016 may be configured to generate a baseband signal and/or receive a baseband signal from another device. In some examples, the transceiver 1016 may be configured to transmit the baseband signal. For example, upon obtaining the baseband signal, the transceiver 1016 may be configured to transmit the baseband signal to a separate device, such as the device 1014. Alternatively, or additionally, the transceiver 1016 may be configured to modify, condition, and/or transform the baseband signal in advance of transmitting the baseband signal. For example, the transceiver 1016 may include a quadrature up-converter and/or a digital to analog converter (DAC) that may be configured to modify the baseband signal. Alternatively, or additionally, the transceiver 1016 may include a direct radio frequency (RF) sampling converter that may be configured to modify the baseband signal.

In some examples, the digital transmitter 1002 may be configured to obtain a baseband signal via connection 1010. In some examples, the digital transmitter 1002 may be configured to up-convert the baseband signal. For example, the digital transmitter 1002 may include a quadrature up-converter to apply to the baseband signal. In some examples, the digital transmitter 1002 may include an integrated digital to analog converter (DAC). The DAC may convert the baseband signal to an analog signal, or a continuous time signal. In some examples, the DAC architecture may include a direct RF sampling DAC. In some examples, the DAC may be a separate element from the digital transmitter 1002.

In some examples, the transceiver 1016 may include one or more subcomponents that may be used in preparing the baseband signal and/or transmitting the baseband signal. For example, the transceiver 1016 may include an RF front end (e.g., in a wireless environment) which may include a power amplifier (PA), a digital transmitter (e.g., 1002), a digital front end, an institute of electrical and electronics engineers (IEEE) 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some examples, a radio (e.g., a radio frequency circuit 1004) of the transceiver 1016 may be synchronized with the resource controller via the S-plane device, which may contribute to high-accuracy timing with respect to a reference clock.

In some examples, the transceiver 1016 may be configured to obtain the baseband signal for transmission. For example, the transceiver 1016 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 1016 may be configured to generate a baseband signal for transmission. In these and other examples, the transceiver 1016 may be configured to transmit the baseband signal to another device, such as the device 1014.

In some examples, the device 1014 may be configured to receive a transmission from the transceiver 1016. For example, the transceiver 1016 may be configured to transmit a baseband signal to the device 1014.

In some examples, the radio frequency circuit 1004 may be configured to transmit the digital signal received from the digital transmitter 1002. In some examples, the radio frequency circuit 1004 may be configured to transmit the digital signal to the device 1014 and/or the digital receiver 1006. In some examples, the digital receiver 1006 may be configured to receive a digital signal from the RF circuit and/or send a digital signal to the processing device 1008.

In some examples, the processing device 1008 may be a standalone device or system, as illustrated. Alternatively, or additionally, the processing device 1008 may be a component of another device and/or system. For example, in some examples, the processing device 1008 may be included in the transceiver 1016. In instances in which the processing device 1008 is a standalone device or system, the processing device 1008 may be configured to communicate with additional devices and/or systems remote from the processing device 1008, such as the transceiver 1016 and/or the device 1014. For example, the processing device 1008 may be configured to send and/or receive transmissions from the transceiver 1016 and/or the device 1014. In some examples, the processing device 1008 may be combined with other elements of the communication system 1000.

FIG. 11 illustrates a diagrammatic representation of a machine in the example form of a computing device 1100 within which a set of instructions, for causing the machine to perform any one or more of the methods discussed herein, may be executed. The computing system may be configured to implement or direct one or more operations associated with AP interference reduction. The computing device 1100 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 1100 includes a processing device (e.g., a processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)) and a data storage device 1116, which communicate via a bus 1108.

Processing device 1102 represents one or more general-purpose processing devices such as a microprocessor, central processing unit, or the like. More particularly, the processing device 1102 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also include one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computing device 1100 may further include a network interface device 1122, which may communicate with a network 1118. The computing device 1100 also may include a display device 1110 (e.g., a liquid crystal display (LCD) or a cathode ray tube (CRT)), an alphanumeric input device 1112 (e.g., a keyboard), a cursor control device 1114 (e.g., a mouse) and a signal generation device 1120 (e.g., a speaker). In at least one example, the display device 1110, the alphanumeric input device 1112, and the cursor control device 1114 may be combined into a single component or device (e.g., an LCD touch screen).

The data storage device 1116 may include a computer-readable storage medium 1124 on which is stored one or more sets of instructions 1126 embodying any one or more of the methods or functions described herein. The instructions 1126 may also reside, completely or at least partially, within the main memory 1104 and/or within the processing device 1102 during execution thereof by the computing device 1100, the main memory 1104 and the processing device 1102 also constituting computer-readable media. The instructions may further be transmitted or received over a network 1118 via the network interface device 1122.

While the computer-readable storage medium 1124 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

EXAMPLES

The following provide examples of the performance characteristics according to embodiments of the present disclosure.

Example 1: Comparison Between No UL MU-MIMO Precoding and UL MU-MIMO Precoding for Data Rate Uplink MU-MIMO precoding gives a significant performance increase (e.g., as measured in PHY rate in Mbits/s) compared to a case in which UL MU-MIMO precoding is not used. The performance difference was performed on a B channel model with 4 transmitting stations (two antennas and 1 spatial stream per antenna) and an AP with 4 receiving (RX) antennas.

For example, for a channel SNR/dB of about 20, the no UL precoding case provides a PHY rate of about 2000 Mbit/s, while the UL MU-MIMO case provides a PHY rate of about 4000 Mbit/s. This difference in performance is steady across the channel SNR/dB before plateauing at around a channel SNR/dB of about 40 and greater. Therefore, UL MU MIMO precoding facilitates a performance increase compared to the baseline case in which UL MU MIMO precoding is not used.

In some examples, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An access point (AP) for wireless communication, comprising:
   data processing hardware; and
   memory hardware in communication with the data processing hardware, the memory hardware storing instructions that when executed on the data processing hardware cause the data processing hardware to perform operations comprising:
   identify, at the AP, a plurality of transmitting stations having a plurality of spatial streams;
   send, from the AP to the plurality of transmitting stations, a sounding request;
   perform, at the AP, multiple user multiple input multiple output (MU-MIMO) channel estimation based on a sounding request response;
   compute, at the AP, one or more precoder coefficients for the plurality of transmitting stations based on the MU-MIMO channel estimation;
   send, from the AP to the plurality of transmitting stations, the one or more precoder coefficients and a transmission trigger;
   receive, at the AP from a station of the plurality of transmitting stations, a transmission that was sent to the AP in view of the one or more precoder coefficients;
   update at the AP, the one or more precoder coefficients to generate one or more updated precoder coefficients with respect to the station; and
   send, from the AP to the station, the one or more updated precoder coefficients.

2. The AP of claim 1, wherein the operations comprising:
perform, at the AP, MU-MIMO channel estimation based on one or more of an uplink sounding packet or an uplink data transmission.

3. The AP of claim 1, wherein the operations comprising:
compute, at the AP, the one or more precoder coefficients using one or more of: minimum mean square error (MMSE), phase optimization, or power loading.

4. The AP of claim 1, wherein the operations comprising:
assign, at the AP from the plurality of transmitting stations, a predetermined phase value for a station; and
report, from the AP to the plurality of transmitting stations, phase values for precoder coefficients based on a difference from the predetermined phase value.

5. The AP of claim 1, wherein the operations comprising:
report, from the AP to the plurality of transmitting stations, the one or more precoder coefficients based on a difference between consecutive carriers; or
report, from the AP to the plurality of transmitting stations, the one or more precoder coefficients using subcarrier grouping.

6. The AP of claim 1, wherein the operations comprising:
report, from the AP to the plurality of transmitting stations, the one or more precoder coefficients and the signal to noise ratio (SNR) for one or more carriers or one or more spatial streams.

7. The AP of claim 1, wherein the operations comprising:
send, from the AP to the plurality of transmitting stations, transmission parameters comprising one or more of:
   a power normalization value,
   a clock frequency,
   a clock phase,
   a clock start time correction value,
   a number of spatial streams,
   a number of transmit antennas,
   antenna indices of transmit antennas,
   a number of bits for coefficient amplitude,
   a number of bits for coefficient phase,
   amplitude values for precoder coefficients,
   phase values for precoder coefficients,
   real values for precoder coefficients, or
   imaginary values for precoder coefficients.

8. The AP of claim 1, wherein the operations comprising:
reduce a quantization of the one or more precoder coefficients based on a modulation and coding scheme (MCS); and
send, from the AP to the plurality of transmitting stations, transmission parameters comprising a first set of transmission parameters and a second set of transmission parameters, wherein the first set of transmission parameters are sent using high-bit resolution and the second set of transmission parameters are sent using a low-bit resolution, wherein the high-bit resolution is higher than the low-bit resolution.

9. The AP of claim 1, wherein the operations comprising:
send, from the AP to the plurality of transmitting stations, compressed precoder matrixes comprising: the one or more precoder coefficients, one or more frequency correction values, one or more phase correction values, or one or more timing correction values.

10. The AP of claim 1, wherein the operations comprising:
receive, at the AP from the plurality of transmitting stations, one or more MU-MIMO precoded transmissions;
update, at the AP, the one or more precoder coefficients based on the one or more MU-MIMO precoded transmissions to generate one or more updated precoder coefficients; and
send, from the AP to the plurality of transmitting stations, the updated precoder coefficients.

11. The AP of claim 1, wherein using the one or more precoder coefficients are operable to facilitate one or more of an upstream capacity increase, a data rate increase, a power consumption decrease, or a latency reduction compared to a baseline when the one or more precoder coefficients are not used.

12. A transmitting station (STA) for wireless communication, comprising:
data processing hardware; and
memory hardware in communication with the data processing hardware, the memory hardware storing instructions that when executed on the data processing hardware cause the data processing hardware to perform operations comprising:
receive, at the STA from an access point (AP), a sounding request;
send, from the STA to the AP, a sounding packet in response to the sounding request;
receive, at the STA from the AP, one or more precoder coefficients;
receive, at the STA from the AP, a transmission trigger;
perform, at the STA, multiple input multiple output (MIMO) precoding using the one or more precoder coefficients;
send, from the STA to the AP, one or more MU-MIMO precoded transmissions; and
receive, at the STA from the AP, updated precoder coefficients based on the MU-MIMO precoded transmissions.

13. The STA of claim 12, wherein the operations comprising:
receive, at the STA, phase information and a signal to noise ratio (SNR).

14. The STA of claim 12, wherein the operations comprising:
receive, at the STA from the AP, a signal to noise ratio (SNR) for a spatial stream; and
perform, at the STA, gain optimization to compute the one or more precoder coefficients.

15. The STA of claim 12, wherein the operations comprising:
receive, from the AP at the STA, transmission parameters comprising one or more of:
a power normalization value,
a clock frequency,
a clock phase,
a clock start time correction value,
a number of spatial streams,
a number of transmit antennas,
antenna indices of transmit antennas,
a number of bits for coefficient amplitude,
a number of bits for coefficient phase,
amplitude values for precoder coefficients,
phase values for precoder coefficients,
real values for precoder coefficients, or
imaginary values for precoder coefficients.

16. The STA of claim 12, wherein the operations comprising:
receive, from the AP at the STA, compressed precoder matrixes comprising: the one or more precoder coefficients, one or more frequency correction values, one or more phase correction values, or one or more timing correction values.

17. The STA of claim 12, wherein the updated precoder coefficients are based on the MU-MIMO precoded transmissions.

18. A method for uplink multiple user multiple input multiple output (UL MU-MIMO), comprising:
performing, at an access point (AP), multiple input multiple output (MIMO) channel estimation in an uplink (UL) direction for a plurality of transmitting stations (STAs);
computing, at the AP, one or more precoder coefficients based on the MIMO channel estimation;
sending, from the AP to the plurality of STAs, the one or more precoder coefficients;
updating at the AP, the one or more precoder coefficients to generate one or more updated precoder coefficients with respect to the station; and
sending, from the AP to the station, the one or more updated precoder coefficients.

19. The method of claim 18, further comprising:
performing, at the AP, the MIMO channel estimation based on one or more of an uplink sounding packet or an uplink data transmission.

20. The method of claim 18, further comprising:
computing, at the AP, the one or more precoder coefficients using one or more of: minimum mean square error (MMSE), phase optimization, or power loading.

* * * * *